US012657214B2

(12) United States Patent (10) Patent No.: US 12,657,214 B2
Ragukumar et al. (45) Date of Patent: Jun. 16, 2026

(54) IMPLEMENTING LARGE LANGUAGE MODELS TO EXTRACT CUSTOMIZED INSIGHTS FROM LOG DATA

(71) Applicant: Kzanna, Inc., Palo Alto, CA (US)

(72) Inventors: Vikram Ragukumar, San Ramon, CA (US); Ashutosh Shanker, Dublin, CA (US); Amol Iyer, San Jose, CA (US)

(73) Assignee: Kzanna, Inc., Palo Alto, CA (US)

( * ) Notice: Subject to any disclaimer, the term of this patent is extended or adjusted under 35 U.S.C. 154(b) by 0 days.

(21) Appl. No.: 18/779,727

(22) Filed: Jul. 22, 2024

(65) Prior Publication Data

US 2025/0200073 A1 Jun. 19, 2025

Related U.S. Application Data

(63) Continuation-in-part of application No. 18/541,890, filed on Dec. 15, 2023.

(51) Int. Cl.
*G06F 7/00* (2006.01)
*G06F 16/28* (2019.01)
(52) U.S. Cl.
CPC .................................. *G06F 16/285* (2019.01)
(58) Field of Classification Search
CPC ...................................................... G06F 16/285

USPC .................................................. 707/600–899
See application file for complete search history.

(56) References Cited

U.S. PATENT DOCUMENTS

| | | | |
|---|---|---|---|
| 2022/0309037 A1 | 9/2022 | Gutierrez | |
| 2022/0405592 A1 | 12/2022 | Niu | |
| 2023/0206001 A1* | 6/2023 | Srivastava | ................ G06F 3/14 704/9 |
| 2023/0291755 A1 | 9/2023 | Siebel | |

FOREIGN PATENT DOCUMENTS

| | | |
|---|---|---|
| CN | 115794480 | 3/2023 |
| WO | 2023/240280 | 12/2023 |

* cited by examiner

*Primary Examiner* — Isaac M Woo
(74) *Attorney, Agent, or Firm* — David R. Stevens; Stevens Law Group

(57) ABSTRACT

Systems and methods for identifying and classifying log events using large language models. A method includes ingesting log data output by a computer system and ingesting domain-specific data applicable to the computer system. The method includes providing the log data and the domain-specific data to an engine configured to assess the log data in view of the domain-specific data to provide a sentiment classification to at least one log event within the log data. The method includes receiving from the engine the sentiment classification for the at least one log event within the log data.

20 Claims, 17 Drawing Sheets

100

100

Data Shippers 102

Data Processing Engine 104

Data Streaming Service
202

Data Preprocessor
204

Index
Search
Database
106

100

Index Search
Database
106

Artificial Intelligence And
Machine Learning (AI/ML)
Engine 110

Data Query 308

Domain-
Specific
Database
108

Domain-Specific Query
310

Embedding Large Language Model (LLM)
302

Store Embedding 312

Vector
Database
304

Prompt Generation 314

Completion Large Language Model (LLM)
306

Natural Language Response 316

Response Processor
112

500

Data Shippers
102

Raw Data 502

Data Preprocessor 204

Preprocessed Data 504

Index Search Database 106

Preprocessed Data 504

AI/ML Engine 110

Data Preprocessing 506

Abbreviating Well-Known Domain-Specific Terms 508

Substituting Of Large Length Identifiers 510

Suppressing Duplicate Information 512

Suppressing Correlated Events 514

Suppressing Events Based On User Feedback 516

Suppressing Events Based On Cached Request And Response Data 518

Data Shippers
102

Raw Data 502

Data
Preprocessor
204

Preprocessed Data 504

AI/ML Engine
110

Improve Quality Of AI/ML Engine Output
602

Drive Ratings Of Responses Based On
User Feedback 802

Request
Processor
408

Feedback
Database
410

900

1000

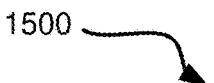

1500

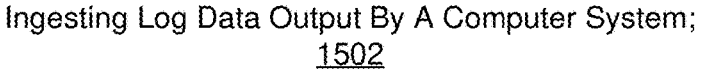

Ingesting Log Data Output By A Computer System;
1502

Ingesting Domain-Specific Data Applicable To The Computer System.
1504

Providing The Log Data And The Domain-Specific Data To An Engine Configured To Assess The Log Data In View Of The Domain-Specific Data To Provide A Sentiment Classification To At Least One Log Event Within The Log Data.
1506

Receiving From The Engine The Sentiment Classification For The At Least One Log Event Within The Log Data.
1508

FIG. 15

IMPLEMENTING LARGE LANGUAGE MODELS TO EXTRACT CUSTOMIZED INSIGHTS FROM LOG DATA

CROSS-REFERENCE TO RELATED APPLICATION

This application is a continuation in part of U.S. patent application Ser. No. 18/541,890, filed Dec. 15, 2023, which is hereby incorporated by reference in its entirety.

TECHNICAL FIELD

The disclosure relates to computing networks and particularly relates to implementing large language models to extract customized insights from input datasets.

BACKGROUND

Large datasets are valuable sources of information that can provide nuanced insights into various industries. However, large datasets are difficult to manage and analyze, and oftentimes require copious quantities of computational resources to extract insights from the data. In some cases, human data scientists must manually analyze large datasets. This is expensive, inefficient, time consuming, and often ineffective when attempting to identify correlations or anomalies in large sums of data.

In some cases, artificial intelligence (AI) and machine learning (ML) may be utilized to assess large datasets. Large language models (LLMs) are utilized in the field of natural language processing (NLP) and artificial intelligence. Large language models are neural network-based architectures that are pre-trained on large sums of textual data. Large language models are capable of capturing intricate patterns and semantic information within text, and this makes them proficient in generating human-like language. Large language models can be fine-tuned for a range of natural language understanding and generating tasks, including text classification, sentiment analysis, translation, summarization, and others. However, even when large language models are fine-tuned to perform a specific task, they are typically limited from outputting an analysis within the context of a specialized field, industry, or subject area.

What is needed are systems, methods, and devices for leveraging large language models to assess large datasets within the context of domain-specific information. The domain-specific information may include knowledge, data, or content that is specific to a particular field, industry, or subject area. Domain-specific information is valuable because it provides in-depth insights and expertise in a particular area, and thus allows professionals and specialists to make informed decisions, solve specific problems, and advance work within that domain.

Considering the foregoing, disclosed herein are systems, methods, and devices for utilizing large language models to extract and track insights from large input datasets, wherein the extracted insights are identified in view of context provided by domain-specific information.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified.

Advantages of the disclosure will become better understood regarding the following description and accompanying drawings where:

FIG. 5 is a schematic block diagram illustrating a process flow for data preprocessing prior to providing the preprocessed data to an AI/ML engine;

FIG. 15 is a schematic flow chart diagram of a method for ingesting and assessing log data.

DETAILED DESCRIPTION

Figure 1:
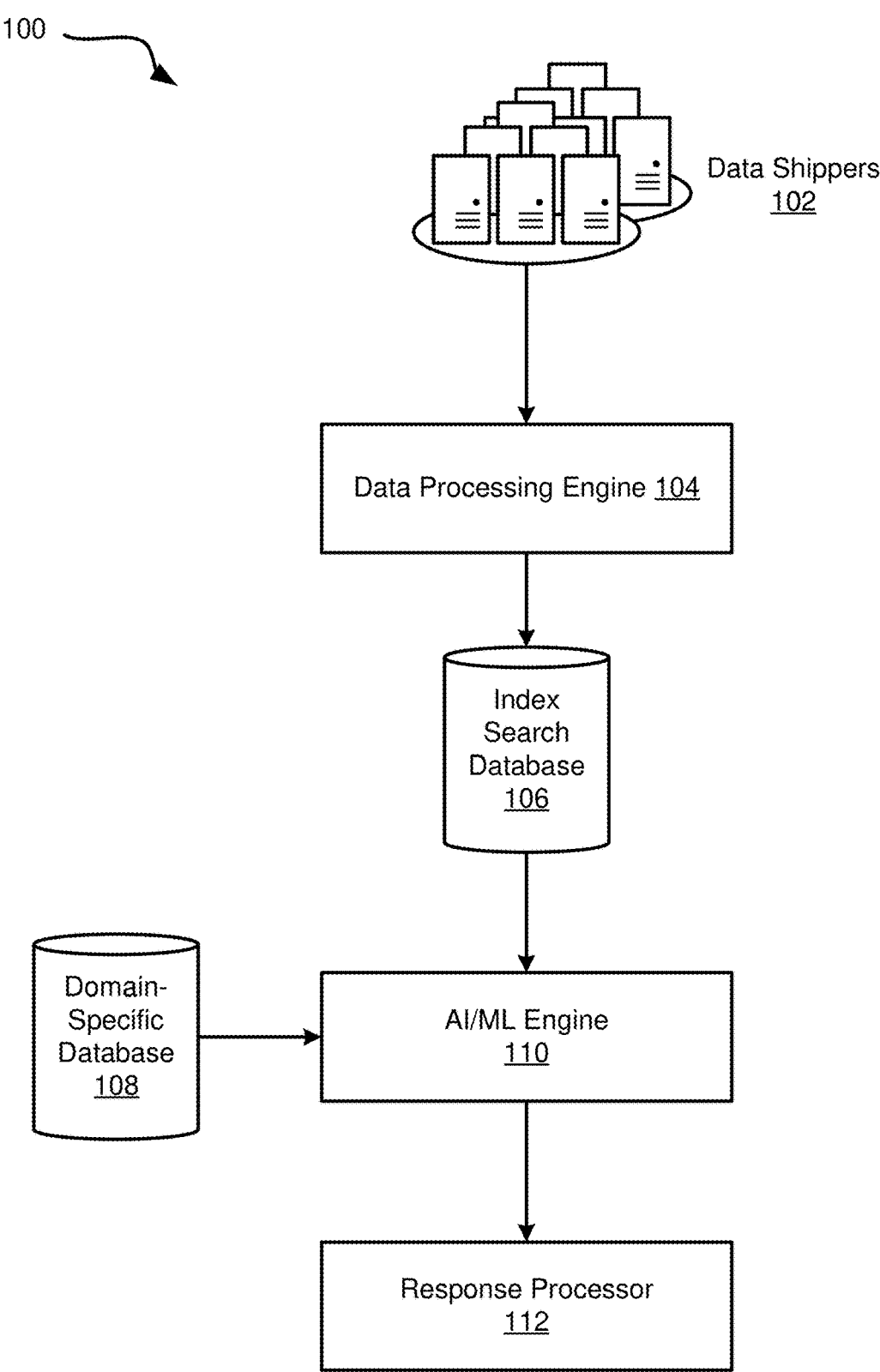
FIG. 1 is a schematic block diagram of a system for executing a large language model to identify and track insights within a dataset.

Described herein are systems, methods, and devices for executing a large language model to identify and track insights in a large dataset. The systems, methods, and devices described herein may be implemented in various use-cases and are not limited to the specific implementations described herein. The systems, methods, and devices described herein may be leveraged to analyze, for example, networking data, research data, sensor data, manufacturing data, social media data, public relations data, financial data, retail data, security data, and so forth.

The systems described herein include an artificial intelligence and machine learning (AI/ML) engine configured to execute a large language model on pre-processed data to identify insights within a large dataset. The identified insights include, for example, patterns within the data, trends within the data, correlations and relationships within the data, anomalies and outliers within the data, predictive information, performance metrics, and so forth. The systems described herein further include extensive data preprocessing modules configured to preprocess data prior to providing the data to the AI/ML engine.

The systems, methods, and devices described herein may specifically be implemented to identify patterns, trends, correlations, and anomalies in log files for a networking computing environment. Computing operations encompass a wide range of systems and infrastructures, and these can be susceptible to various challenges. Numerous issues can arise due to malfunctions in hardware or software. Hardware failures may include malfunctions in hard drives, RAM, CPUs, and power supplies. These can lead to data loss, system crashes, or compromised system components due to power fluctuations. Software failures may occur when bugs within the code manifest as system crashes, data corruptions, security vulnerabilities, and so forth.

Network challenges add another layer of complexity. Issues like latency, packet loss, bandwidth constraints, and connectivity outages can disrupt normal operations. Security remains an important concern in computing, with threats ranging from malware and viruses that can corrupt systems, to unauthorized breaches that expose sensitive data, and further to distributed denial of service attacks that overwhelm and render services unavailable. Missteps in system configuration or poor capacity planning can bring their own set of challenges. Computing systems may be set up incorrectly or might not have the storage or processing capacity to manage operational demands. Additionally, human errors, such as misconfigurations or accidental data deletions, can lead to widescale issues across a computing system. In many cases it is important to detect anomalies within a computing system to ensure the health and performance of the system. Anomalies can indicate underlying issues that may be affecting the system's performance. If anomalies are not detected, and the underlying issues are not addressed, then the system may experience an outage or performance issues.

In view of the foregoing, disclosed herein are systems, methods, and devices for autonomously tracking and detecting anomalies within a computing system. Computing anomalies include irregularities, deviations, and unexpected patterns in the behavior or operations of computing systems. Anomalies can emerge from a variety of sources, including hardware malfunctions, software glitches, and malicious activities. For example, performance related anomalies may include unexpected CPU spikes, memory leaks, excessive hard drive activity, traffic surges, activity on uncommon ports, irregular data transfers to internal or external locations, multiple failed login attempts, system crashes, application errors, corrupted data, missing data, duplicate data entries, unplanned changes to system settings, deviations from standard configurations, and so forth. Anomalies can hint at deeper issues, potential security breaches, or impending system failures.

The systems, methods, and devices described herein are implemented to autonomously detect and track patterns, trends, correlations, and anomalies within computing systems. Detecting anomalies in computing systems is an important function for several reasons, including maintaining system health and performance, guarding against security threats, ensuring operational continuity, reducing resource usage, ensuring compliance with various regulations, ensuring positive user experience, maintaining data integrity, predicting upcoming maintenance, efficiently allocating resources, and improving understanding of the system to unsure continual improvement of the system.

Anomalies can indicate underlying issues that may be impacting a computing system's performance. For example, an unexpected spike in CPU usage may indicating a misbehaving application or a malware process. Addressing such anomalies ensures optimal performance and longevity of the system. Further, numerous security threats, such as unauthorized access, data breaches, and malware activities, may first manifest as an anomaly within the system behavior. Early detection of these anomalies can be crucial in preventing, mitigating, and responding to security incidents. Additionally, anomalies can suggest issues with data processing or storage, which can lead to corrupted or lost data. In systems where data integrity is crucial, such as financial or medical systems, it can be important to detect anomalies to ensure accuracy and trustworthiness of the data. In environments with interconnected devices, detecting anomalies can provide insights into devices that might soon fail or need maintenance. This initiative-taking approach can prevent larger system-wide failures.

Downtime or system failures can have significant impacts on business, and particularly those that rely heavily on information technology infrastructure for their operations. Anomalies can serve as early warning signs of impending system failures. Thus, the detection of anomalies allows system administrators to take preemptive measures to avoid system disruptions. Additionally, undetected anomalies, and particularly those related to resource usage (like memory leaks or unoptimized queries), can lead to financial costs. This is particularly relevant in cloud environments where resources are billed based on usage. Many industries are subject to regulations that mandate certain standards for data protection, system uptime, and security. Detecting and addressing anomalies is often necessary to maintain compliance and avoid potential legal repercussions or penalties. Further, detecting anomalies can aid system administrators in making informed decisions regarding resource allocation. For example, recognizing patterns of high traffic can lead to better distribution of network or server resources during peak times.

Further, for software applications and online platforms, anomalies can result in suboptimal user experiences. Detecting and fixing these issues promptly ensures that users have a smooth and efficient experience, which leads to higher satisfaction and retention rates. Over time, the consistent monitoring and analysis of anomalies can lead to a better understanding of system behavior, and this may enable system administrators to improve the design and operation of the computing system.

The systems, methods, and devices described herein utilize large language models to autonomously detect and track insights within computing systems, wherein the insights may include, for example, patterns, trends, correlations, and anomalies. A large language model (LLM) is a deep learning model, and specifically a variant of transformer architecture. LLMs are trained on vast amounts of text data and may be configured with numerous parameters enabling them to generate or read text based on patterns identified in the data. LLMs may be trained on diverse text data extracted from the web or provided in a training dataset. LLMs are traditionally utilized for a variety of tasks, including generating text, answering questions, completing text, translating text, summarizing text, and so forth. Described herein are means for leveraging an LLM to interpret and identify unusual patterns in textual data generating by computing systems.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods described herein are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 is a schematic block diagram of a system 100 for leveraging large language models (LLMs) to identify and track insights in large datasets. In some cases, the system 100 may be implemented to detect and track anomalies within a computing system and may specifically be used to detect and track anomalies within a networking deployment. However, the system 100 may be implemented in a variety of use-cases and may leverage the large language models to identify any needed insights within an input dataset.

The system 100 includes a data shippers 102 that provides data to a data processing engine 104. The data processing engine provides pre-processed data to an index search database 106. The system 100 includes an artificial intelligence/machine learning (AI/ML) engine 110 that retrieves data from the index search database 106 and additionally retrieves data from a domain-specific database 108. The AI/ML engine 110 utilizes one or more large language models to identify and track insights into data stored in the index search database 106 based on context provided by the domain-specific database 108. The system 100 includes a response processor 112 that generates notifications and summaries outlining the insights gleaned from data stored on the index search database 106.

The data shippers 102 is responsible for collecting, processing, and transporting data from a data source (may specifically include a client utilizing services provided by the system 100) to a centralized data storage or analysis platform. The data shippers 102 serves as a conduit for moving data from where the data is generated to where the data is needed for storage in the index search database 106 and eventual analysis by the AI/ML engine 110. Depending on the applicable use-case, the data shippers 102 captures logs, metrics, events, and other types of data from one or more sources. Before uploading the data, the data shippers 102 may transform, enrich, or filter the data. The data shippers 102 may include applications configured for centralized logging, metrics, collection, and event monitoring.

The data shippers 102 may aggregate data from a plurality of different data sources and by way of a plurality of different communication protocols. The data shippers 102 may ingest data from databases, log files, application program interfaces (APIs), sensors, and other data generators. The data shippers 102 may be configured to route raw ingested data to different destinations based on predefined rules. The raw ingested data may be sent to different databases, storage systems, or analytics platforms based on the content of the data and/or the source of the data. The data shippers 102 may be configured to transform or enrich the data prior to providing the data to its next destination. The data shippers 102 may perform data transformation tasks like formatting, filtering, or enriching the data. In some cases, the data shippers 102 may enrich data by adding metadata, geolocation information, or other contextual information to make the data more valuable for analysis.

In some cases, the data shippers 102 provides the data in real-time or near real-time, and thus ensures that data is delivered as it is generated, which may be important for applications like real-time analytics and monitoring. In other cases, the data shippers 102 provides the data for batch processing, wherein data is collected, stored, and sent at scheduled intervals.

The data shippers 102 may perform data encryption to increase the security of sensitive data during transit. Additionally, the data shippers 102 may including monitoring and alerting capabilities to notify users of issues or anomalies in the data flow. The data shippers 102 is capable of ingesting, translating, and transferring data in various formats, including, for example, structured data like JSON, XML, or CSV, unstructured data like log files, and binary data.

The data shippers 102 may specifically be configured as a log shipper. In this configuration, the data shippers 102 is configured to retrieve log data from applications, servers, and systems. The data shippers 102 may specifically be configured as an ETL (Extract, Transform, Load) tool, which can be used to collect, transform, and load data from various sources to data warehouses or databases.

The data processing engine 104 is designed to efficiently process, transform, and analyze large volumes of data. In some implementations, the data processing engine 104 is necessary to manage "big data" and enable various data-related tasks, such as data ingestion, transformation, aggregation, and analysis. The data processing engine 104 may be implemented as a batch processing engine or a stream processing engine depending on the implementation and the desired outputs.

The index search database 106 includes data received from the data shippers 102 that has been preprocessed by the data processing engine 104. The index search database 106 utilizes indexing structures to optimize and accelerate data retrieval operations. The data stored on the index search database 106 may be ingested and aggregated in real-time or near-real-time. Typically, the index search database 106 includes vast sums of data extracted from, for example, networking log files, financial transactions, retail transactions, widespread topic research, sensor data, social media data, and so forth.

The domain-specific database 108 stores domain-specific knowledge and insights into the data context. The domain-specific database 108 is a collection of structured information or datasets specifically designed, curated, and optimized for a particular industry, field of study, customer, or subject area. Unlike general purpose databases that are broad in nature, the domain-specific database 108 caters to the unique needs, terminologies, structures, and nuances of a specific domain. The domain-specific database 108 may be configured with a specialized structure and database scheme to accommodate the data intricacies of the specific domain. Because the domain-specific database 108 is tailored to a specific domain, users of the AI/ML engine 110 can retrieve and analyze relevant information more quickly.

In some implementations, the domain-specific database 108 is updated less frequently than the index search database 106. The data stored on the domain-specific database 108 is interlaced or interspersed within the data stored on the index search database 106. This ensures that more meaningful insights can be identified within the data stored on the index search database 106.

In an example implementation, the AI/ML engine 110 is utilized to assess log files for a large organization. In this case, the domain-specific knowledge and insights may include insights into issues that arise when assessing log files.

The AI/ML engine 110 is a software platform or framework designed to create, train, and deploy artificial intelligence and machine learning models. The AI/ML engine 110 is configured to assess data stored in the index search database 106 and then extract insights from the data. The extracted insights may be determined within a certain context, which is provided by the domain-specific database 108. The extracted insights may include, for example, patterns within the data, correlated events in the data, anomalies within the data, and so forth. The AI/ML engine 110 communicates those insights to the response processor 112.

The AI/ML engine 110 may be deployed as a single instance on-premises deployment. In this case, the AI/ML engine 110 is deployed as a single instance of software that is installed and operated on an on-premises server, server cluster, or other hardware within a customer's own data center or physical infrastructure. This is contrasted with a multi-instance deployment wherein multiple instances of the software are deployed on different servers. This deployment model offers a high degree of control to the customer over the software, its configuration, and the underlying infrastructure. This can be important for organizations with security, compliance, or customization requirements.

The response processor 112 is responsible for handling and generating responses or outputs based on inputs or requests received from users or other system components. The response processor 112 is configured to select the most appropriate representation of the response generated by the AI/ML engine 110. In various implementations, certain responses may be better represented as a graph, textual representation, or other representation.

Figure 2:
FIG. 2 is a schematic block diagram illustrating data flow through a data processing engine.

FIG. 2 is a schematic block diagram depicting components of the system 100 first illustrated in FIG. 1, and specifically depicts components of the data processing engine 104. As illustrated in FIG. 2, the data processing engine 104 receives input data from one or more data shippers 102. The data processing engine 104 includes a data streaming service 202 and a data preprocessor 204. After the input data is processed by the data processing engine 104, the data is partitioned and stored on the index search database 106.

The data streaming service 202 processes, analyzes, and transmits real-time data from one or more sources in a continuous and scalable manner. The data streaming service 202 is capable of handling large volumes of data generated in real-time, such as sensor data, logs, social media updates, financial transactions, and so forth. The data streaming service 202 performs real-time data ingestion with low latency and high scalability. The data streaming service 202 is built with fault tolerance to ensure data reliability, such that data is not lost in the event of a system failure.

The data preprocessor 204 is a tool or set of procedures used to transform, prepare, and clean raw data received from the data shippers 102 into a format more suitable for analysis, modeling, and further processing. The data preprocessor 204 helps improve data quality, reduce noise, and ensure the data is transformed into a suitable format for analysis by the AI/ML engine 110. The data preprocessor 204 performs one or more of data cleaning, data transformation, data reduction, data sampling, data encoding, data splitting, data imputation, or data scaling.

In some implementations, the data preprocessor 204 is specifically configured to reduce a character count of the raw data received from the data shippers 102. The reduced data is then stored on the index search database 106 and ultimately provided to the AI/ML engine 110, in lieu of providing the raw data to the AI/ML engine 110. This reduces the amount of storage resources required for the index search database 106, and additionally reduces the amount of compute resources required for the AI/ML engine 110.

Further in some implementations, the data preprocessor 204 is configured to clean the raw data provided by the data shippers 102. The cleaning process includes removing or correcting erroneous data and inconsistencies in the data. The data preprocessor 204 may convert the raw data into a suitable format or structure for analysis. This may include normalization (i.e., scaling all numerical variables to a standard scale) or standardization. The data preprocessor 204 may recue the volume of data by reducing the quantity of textual characters, without altering the meaning of the data.

Figure 3:
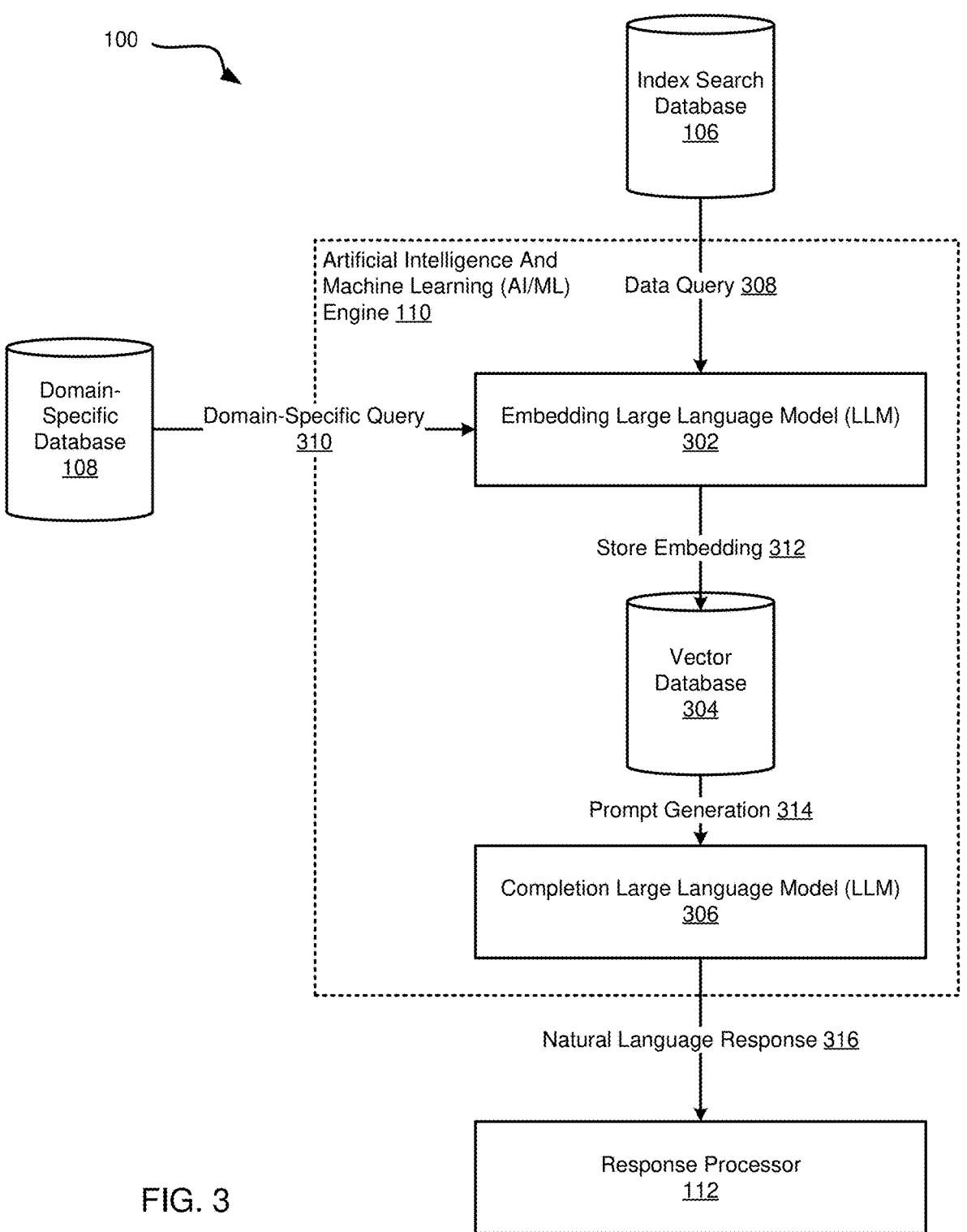
FIG. 3 is a schematic block diagram illustrating data flow through an artificial intelligence and machine learning (AI/ML) engine that includes a large language model.

FIG. 3 is a schematic block diagram depicting components of the system 100 first illustrated in FIG. 1, and specifically depicts components of the artificial intelligence/machine learning (AI/ML) engine 110. As shown in FIG. 3, the AI/ML engine 110 retrieves data from the index search database 106 and the domain-specific database 108. The AI/ML engine 110 includes an embedding large language model (LLM) 302, a vector database 304, and a completion large language model (LLM) 306. The AI/ML engine 110 feeds outputs to the response processor 112.

The AI/ML engine 110 performs a data query 308 on the index search database 106 and performs a domain-specific query 310 on the domain-specific database 108. These input data sources are fed to the embedding LLM 302. The AI/ML engine 110 stores embedding at 312 in the vector database 304. The AI/ML engine 110 prompts generation at 314 and pushes data to the completion LLM 306. The completion LLM 306 executes natural language response at 316 and pushes the output to the response processor 112.

The embedding LLM 302 is configured represent words, phrases, or sentences as continuous numerical vectors in a high-dimensional space using pre-trained language models. The LLM is trained on large sums of text data and has the capability to capture rich contextual information. The embedding LLM 302 is a pre-trained model that is pre-trained on a diverse textual dataset. The embedding LLM 302 is configured to tokenize the input text from the index search database 106 and the domain-specific database 108 into smaller units, such as words or sub-words. The tokenization ensures the text can be processed by the completion LLM 306. The embedding LLM 302 is additionally configured to convert the tokenized data inputs into an embedding vector. The embeddings represent the meaning and context of the tokens in a high-dimensional vector space. The size of the embedding space can vary depending on the model. The embedding LLM 302 is additionally configured to aggregate individual token embeddings to obtain an embedding for entire sequences.

The vector database 304, which may alternatively be referred to as a vector database management system (VDBMS) is a specialized database system designed to efficiently store, manage, and query high-dimensional vector data. In the vector database 304, data is represented as vectors, which are arrays of numerical values that represent a wide range of objects or features in a multi-dimensional space.

The completion LLM 306 is a neural network-based language model trained on large sums of textual data. The completion LLM 306 is trained to generate human-like text based on a given input or prompt. The completion LLM 306 is trained to understand context, generate coherent text, and perform various language-related tasks. The completion LLM 306 is pre-trained on a large and diverse textual dataset. During pre-training, the completion LLM 306 learns to predict the next word in a sentence by considering the context of the words that came before it. This process enables the completion LLM 306 to learn grammar, syntax, semantics, and world knowledge from the text.

The completion LLM 306 receives the prompt generation 314 as an input text. In response to receiving the prompt generation 314, the completion LLM 306 generates a coherent continuation of the text based on the input. The output may include one or more of a sentence, paragraph, or longer document, depending on the task and the prompt. The completion LLM 306 may be fine-tuned to specific tasks or domains. The completion LLM 306 may specifically be fine-tuned to generate natural language responses 316 that are specific to a certain domain based on data extracted from the domain-specific database 108.

Figure 4:
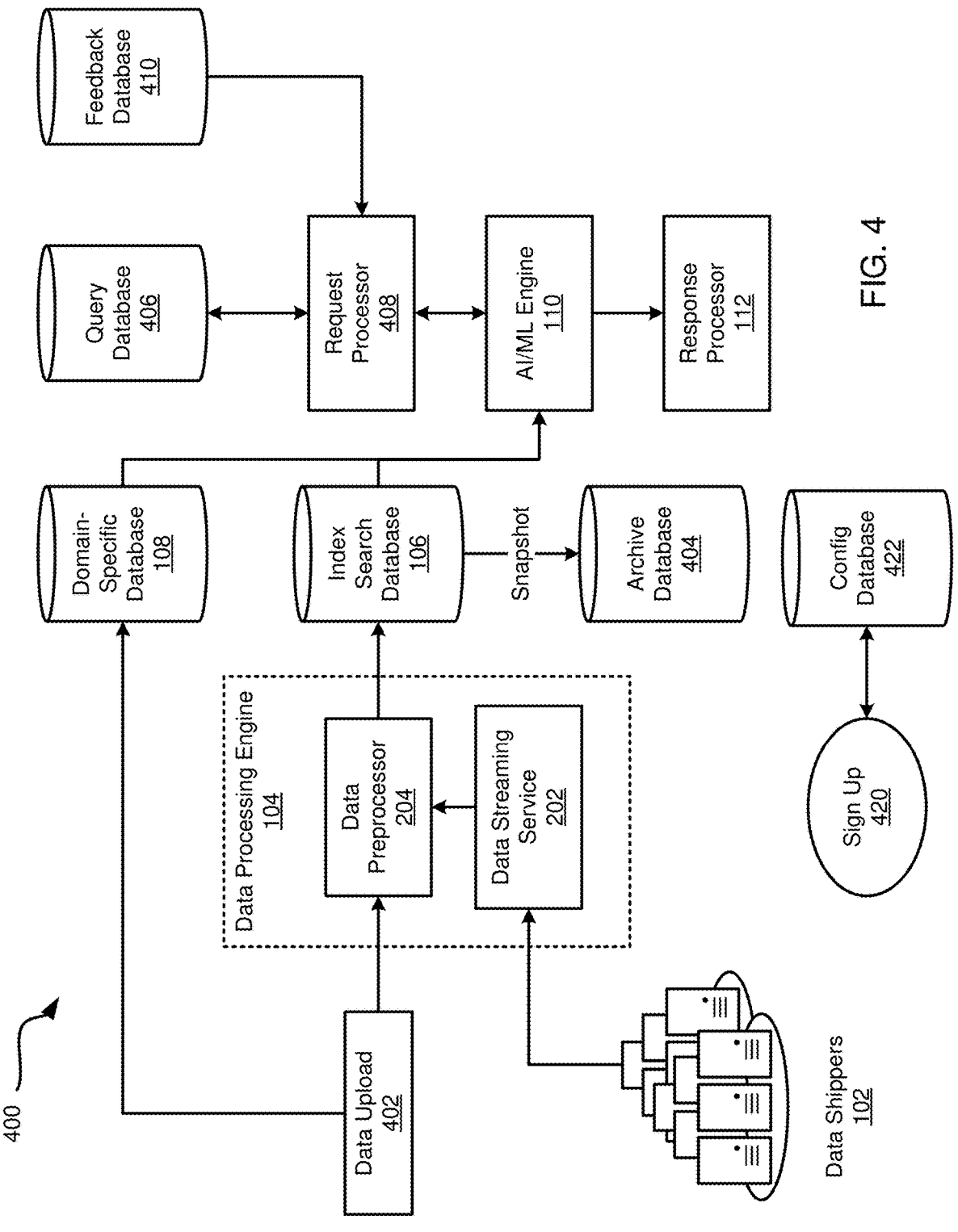
FIG. 4 is a schematic block diagram of a system for executing a large language model to identify and track insights within a dataset.

FIG. 4 is a schematic block diagram of a system 400 for leveraging large language models (LLMs) to identify and track insights in large datasets. The system 400 includes the components of the system 100 first illustrated in FIG. 1, and further includes additional components for performing other tasks.

The system 400 includes the data shippers 102 feeding raw data to the data processing engine 104. The data processing engine 104 includes the data preprocessor 204 and the data streaming service 202. As shown in FIG. 4, the data preprocessor 204 may receive data from direct data upload 402 and additionally from the data shippers 102. The data preprocessor 204 feeds pre-processed data to the index search database 106. The direct data upload 402 service feeds data to the domain-specific database 108. In most cases, the direct data upload 402 will include data that is manually uploaded by a system administrator and/or configured by a system administrator to be automatically pulled on a periodic basis. The processed data stored on the index search database 106 may be stored on an archive database 404 to maintain a historic record of customer data. In some cases, a snapshot of processed customer data stored on the index search database 106 is periodically captured and then stored on the archive database 404.

The system 400 includes the AI/ML engine 110 configured to retrieve data from the index search database 106 and the domain-specific database 108. The AI/ML engine 110 receives requests from the request processor 408 and feeds responses to the response processor 112. The request processor 408 may receive requests from a query database 406. The response processor 112 feeds responses to an engine optimization platform 412. The engine optimization platform 412 includes optimization modules for applications 414, AI assistant 416, and a dashboard 418. The engine optimization platform 412 communicates with a feedback database 410 that is configured to receive user feedback.

The system 400 additionally includes means for signing up 420 for the system and providing sign-up information to a configuration database 422.

The archive database 404 is a specialized database designed for storing historical data that is no longer actively used in day-to-day operations of the system 400. The data stored on the archive database 404 may be required for future reference, training the AI/ML engine 110, historical analysis, or regulatory compliance. The data stored on the archive database 404 has undergone processing and serves as a snapshot of historical data. Periodic snapshots are taken from processed data stored on the index search database 106 (such as processed infrastructure data 1326, processed operational data 1328, and processed vendor data 1330 first illustrated in FIG. 13A) and then stored on the archive database 404. Processed customer data is configured with a retention configuration indicating how often snapshots should be taken, and how long data should be stored on the archive database 404.

The query database 406 is designed for high-performance querying. The query database 406 may be queried in any suitable manner, including through Structured Query Language (SQL) or NoSQL protocols.

The request processor 408 is a component, module, or system that manages and processes incoming requests The request processor 408 augments queries with user role specific information and reprocesses queries to minimize computational cost. Additionally, the request processor 408 utilizes cached query information when applicable to optimize compute usage.

The feedback database 410 is utilized to record user feedback on the responses generated by the system 400. These responses are utilized to train and personalize the behavior of the system 400 and to improve user experience.

In some cases, the system 400 is specifically leveraged to identify patterns and anomalies in log files output by a networking computing system. Identifying anomalies in log files is a useful task for system monitoring, security, and troubleshooting. Log files contain records of various events, activities, and system metrics, and anomalies can indicate unexpected or potentially problematic behavior. The AI/ML engine 110 may identify the anomaly using one or more of threshold-based detection, statistical analysis, machine learning-based detection techniques, time series analysis, log pattern matching, change detection, log correlation, rule-based anomaly detection, or contextual analysis. The AI/ML engine 110 may specifically be trained on historical log data to establish a ground truth of "normal behavior." The AI/ML engine 110 may then utilize models, such as clustering (e.g., k-means) or classification (e.g., Isolation Forest) to identify deviations from the established normal behavior. The AI/ML engine 110 may utilize time series forecasting techniques to predict expected values and flag anomalies when actual values deviate significantly from the predictions.

Identifying two or more correlated events in a log file can be useful for understanding the context and potential causes of system issues or security incidents. The AI/ML engine 110 may identify the two or more correlated events using one or more of log parsing, event timestamps, event grouping, time-based windows, pattern matching, sequence analysis, event counting, correlation metrics, use case-specific rules, and historical analysis. The AI/ML engine 110 may specifically be configured to consider historical data to identify recurring patterns and correlations.

The AI/ML engine 110 may include a recurrent neural network or hidden Markov model configured to identify complex correlations in log data.

Figure 6:
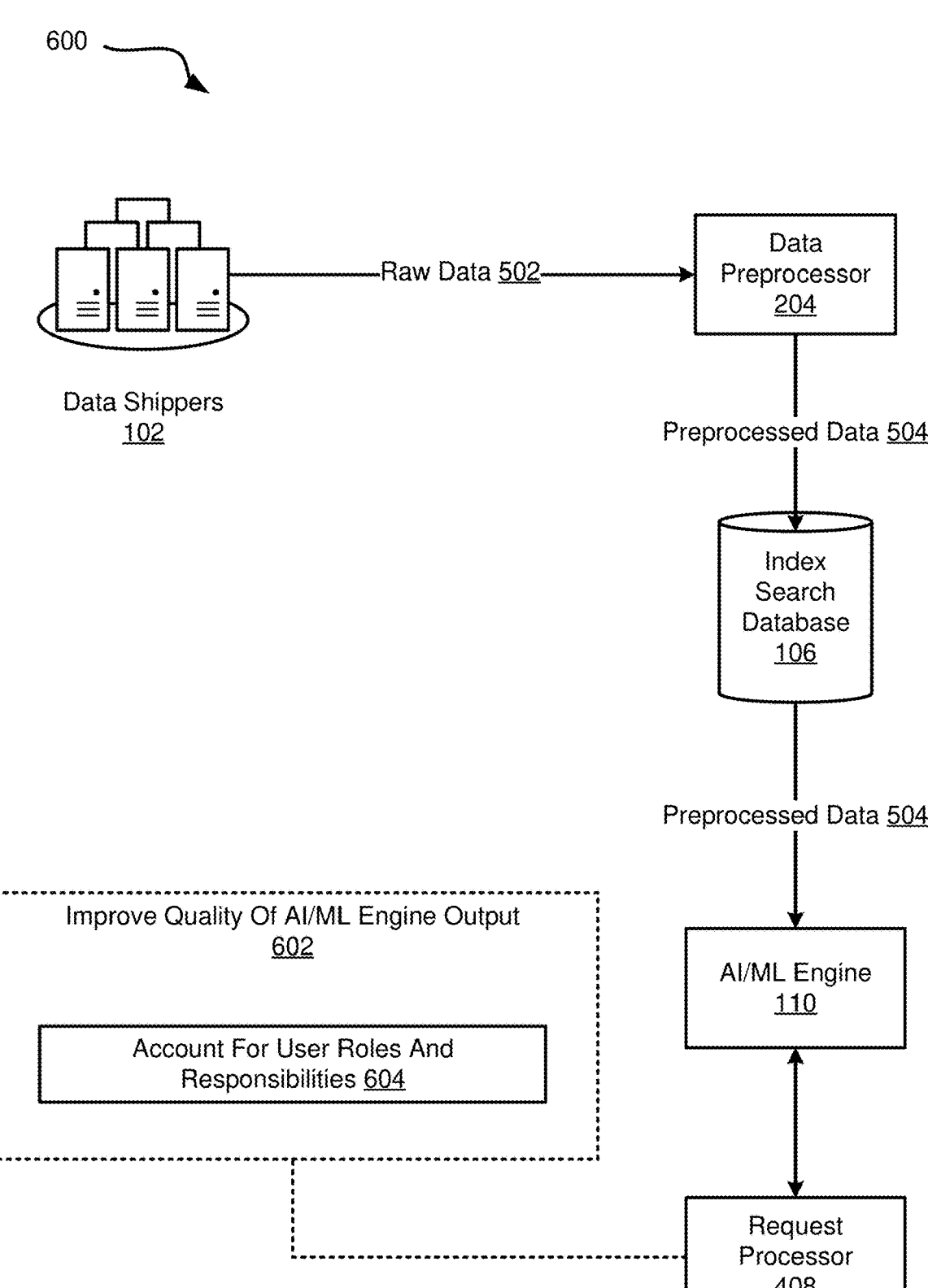
FIG. 6 is a schematic block diagram illustrating a process flow for improving quality of an AI/ML engine output.
Figure 7:
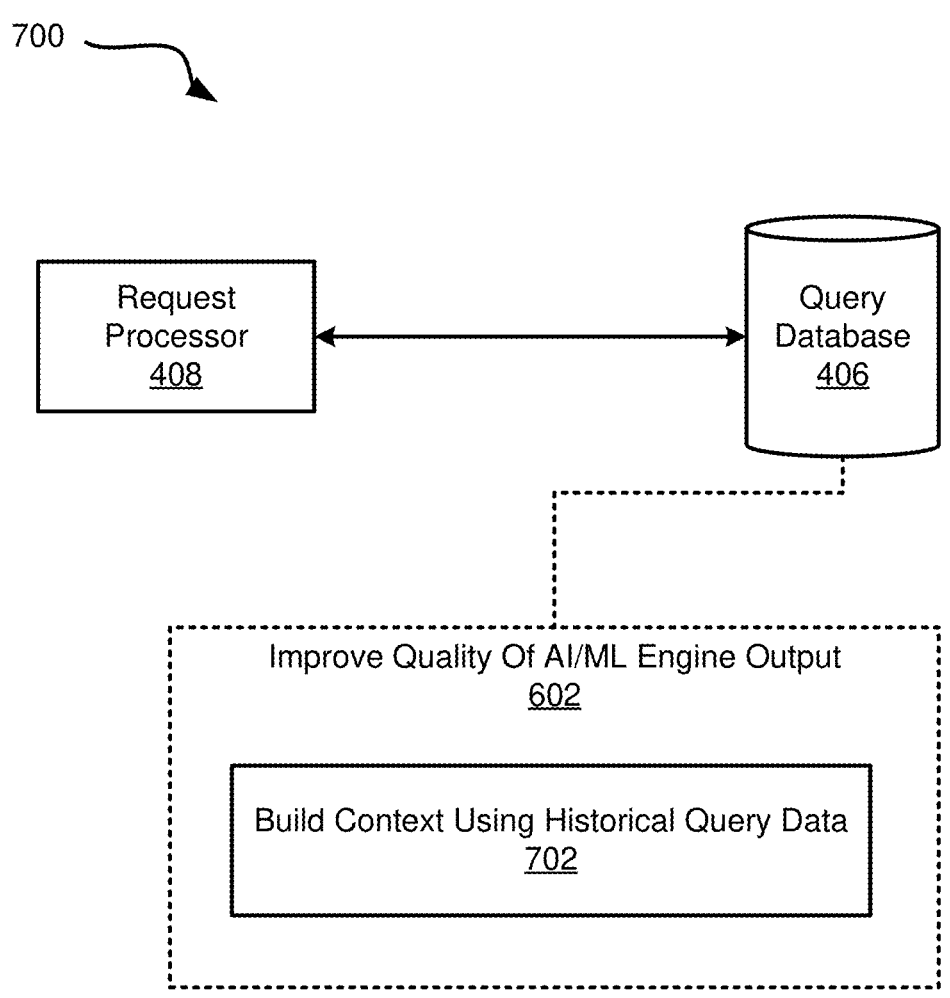
FIG. 7 is a schematic block diagram illustrating a process flow for improving quality of an AI/ML engine output.
Figure 8:
FIG. 8 is a schematic block diagram illustrating a process flow for improving quality of an AI/ML engine output.
Figure 9:
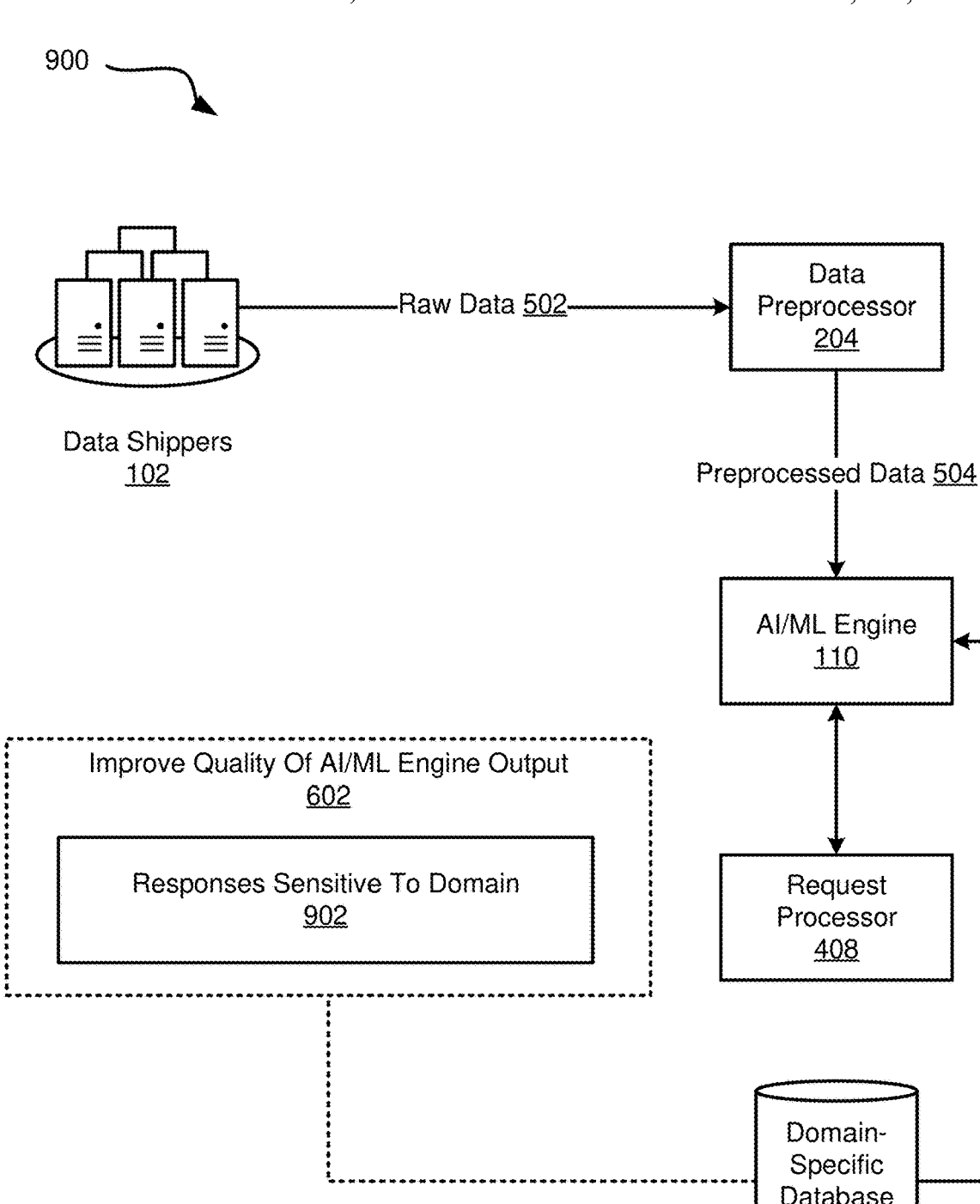
FIG. 9 is a schematic block diagram illustrating a process flow for improving quality of an AI/ML engine output.

FIGS. 5-9 are schematic block diagrams indicating functions performed by some components of the system 400. Specifically, FIG. 5 is a schematic block diagram of a process flow 500 including data processing functions executed by the data preprocessor 204. FIG. 6 is a schematic block diagram of a process flow 600 including functions performed by the request processor 408 to improve the quality of the AI/ML engine output. FIG. 7 is a schematic block diagram of a process flow 700 including functions performed by the query database 406 to improve the quality of the AI/ML engine output. FIG. 8 is a schematic block diagram of a process flow 800 including functions performed by the feedback database 410 and the data preprocessor 204 to improve the quality of the AI/ML engine output. FIG. 9 is a schematic block diagram of a process flow 900 including functions performed by the domain-specific database 108 to improve the quality of the AI/ML engine output.

The process flow 500 illustrated in FIG. 5 depicts the movement of data within the system 400 and further depicts a plurality of data preprocessing 506 functions performed by the data preprocessor 204. As shown in FIG. 5, the data shippers 102 provide raw data 502 to the data preprocessor 204. The data preprocessor 204 performs various data preprocessing 506 functions to generate the preprocessed data 504. The preprocessed data 504 is provided to the index search database 106 and is further provided to the AI/ML engine 110.

The data preprocessing 506 functions include one or more of abbreviating well-known domain-specific terms 508, substituting large length identifiers 510, suppressing duplicate information 512, suppressing correlated events 514, suppressing events based on user feedback 516, and suppressing events based on cached requests and response data 518.

The data preprocessor 204 may transform the raw data 502 at least by abbreviating well-known domain-specific terms 508 to reduce the total character count of the textual input provided to the AI/ML engine 110. The amount of time and compute resources required by the AI/ML engine 110 is related to the total character count provided to the AI/ML engine 110, and thus it is desirable to reduce character count by abbreviating various terms. The terms and the associated abbreviations may be specific to each domain.

Similarly, the data preprocessor 204 may substitute large length identifiers 510 with shorter length identifiers. In data preprocessing, especially when dealing with datasets that have large length identifiers or textual data, it can be beneficial to substitute or transform these lengthy strings to make the data more management and comprehensible. The data preprocessor 204 identifies columns or fields with length identifiers and determines which identifiers should be considered for substitution based on a threshold length. The data preprocessor 204 generates a mapping of original identifiers to shorter or substituted identifiers. The data preprocessor 204 stores the mapping separately so the shortened identifiers may be reverted to the original identifiers as needed. The data preprocessor 204 substitutes the length identifiers with the shorter versions in the main dataset using the mapping. The data preprocessor 204 ensures the transformed dataset has been applied correctly and determines whether any data integrity issues have arisen from the substitution process.

The data preprocessor 204 may suppress one or more of duplicate information 512, correlated events 514, events based on user feedback 516, or events based on cached requests and response data 518. When data is suppressed, the total number of characters provided to the AI/ML engine 110 will be reduced, and thus, operating the AI/ML engine 110 will require reduced storage and compute resources. Additionally, in some cases, it is important to suppress certain types of information to address privacy concerns, remove noise, or ensure data consistency. In some cases, suppression can be important when working with personally identifiable information or other sensitive data.

The process of suppressions 512, 514, 516, 518 includes removing certain data values or attributes. This may be achieved by replacing certain data with a placeholder such as a blank value or another substitute. The data preprocessor 204 executes an automated suppression process. In some cases, the automated suppression process includes querying the raw data 502 to identify certain values, and then replacing those values with nulls or another substitute.

The process flow 600 illustrated in FIG. 6 depicts the movement of data within the system 400 and further depicts a plurality of functions performed by the request processor 408 to improve the quality of an AI/ML engine output 602. The request processor 408 is specifically configured to account for user roles and responsibilities 604 associated with a user profile. The request processor 408 provides intermediate representation that is attached to incoming requests. This allows the system to generate customized view of the dataset being analyzed and the associated responses.

The process flow 700 illustrated in FIG. 7 depicts functions performed by the query database 406 to improve the quality of the AI/ML engine output 602. The query database 406 is utilized to improve context generation, which is then used as an input to the AI/ML engine 110. Creating a strong data context is useful for improving the output of the AI/ML engine 110. Data context refers to background information, metadata, and environmental factors that provide a deeper understanding of the data being used for AI/ML engine 110 tasks.

The query database 406 stores labeled data that is provided to the AI/ML engine 110. The request processor 408 is configured to ensure high-quality data collection by specifying what data should be gathered, how it should be labeled, and under what conditions the data should be captured. The request processor 408 is further configured to collect and store metadata, which may include information about the data source, collection time, data format, and any relevant data transformations.

The process of building context using historical query data 310 includes utilizing historical query information as a guideline or reference to identify topics of interest. The topics of interest may specifically apply to domain-specific data that may be constructed or enhanced by the AI/ML engine 110.

The process flow 800 illustrated in FIG. 8 depicts functions performed by each of the data preprocessor 204 and the feedback database 410 to improve the quality of the AI/ML engine output 602. The feedback database 410 is utilized as input to the data preprocessor 204 to enrich the data that is subsequently stored in the index search database 106. The data stored in the feedback database 410 is utilized to drive ratings of responses based on user feedback 802.

The process flow 900 illustrated in FIG. 9 depicts functions performed by the domain-specific database 108 to improve the quality of the AI/ML engine output 602. The domain-specific database 108 may ensure that responses output by the AI/ML engine 110 are sensitive to a certain domain 902. The domain-specific database 108 includes information relevant to a certain use-case such as networking, security, operations, and so forth. This allows for the AI/ML engine 110 to augment the customer data with domain-specific information to improve the quality of insight.

Figure 10:
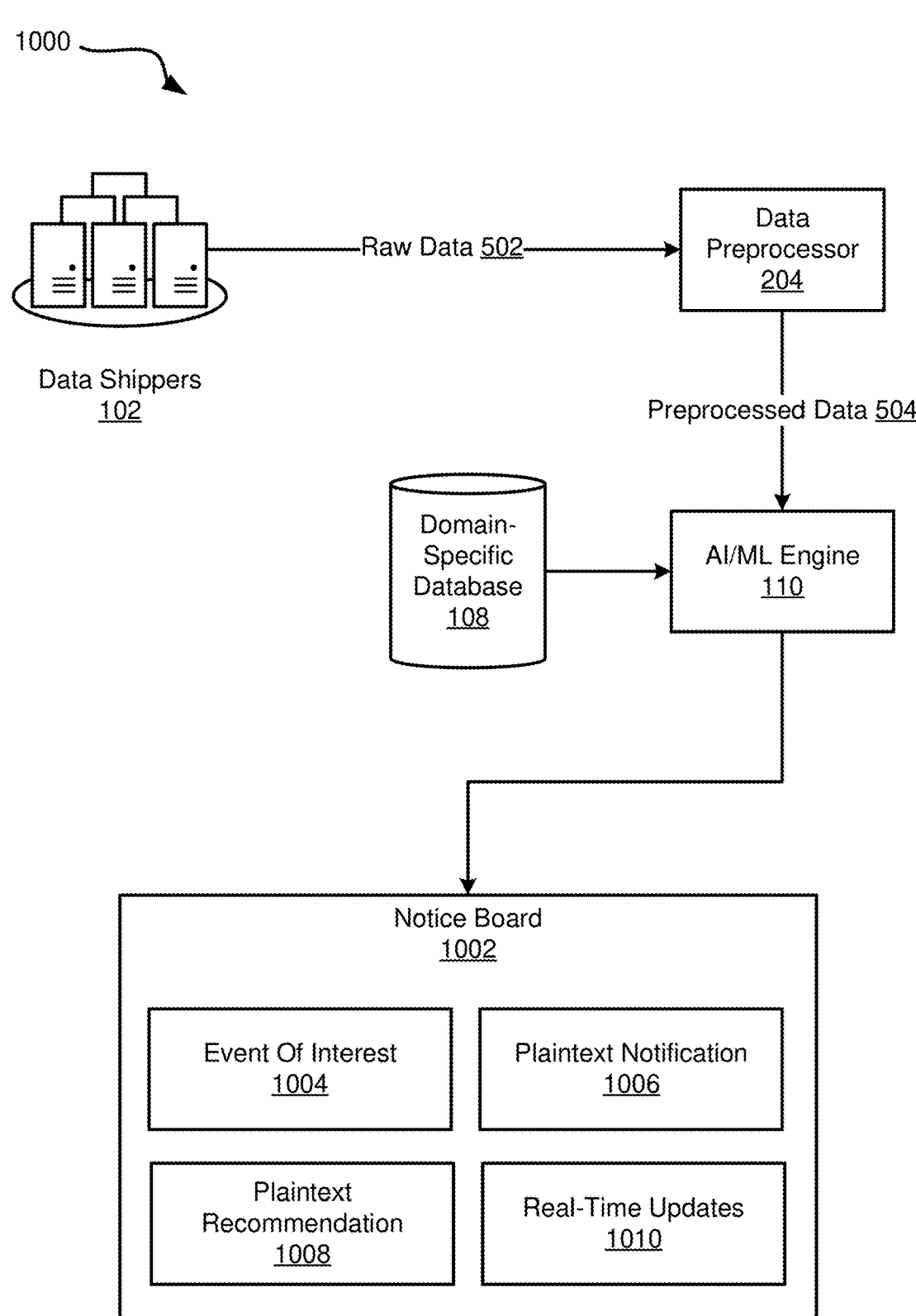
FIG. 10 is a schematic block diagram illustrating some components configured to generate data outputs rendered on a notice board.

FIG. 10 is a schematic block diagram illustrating a process flow 1000 for outputting data to be rendered on a notice board 1002. The process flow 1000 is executed by components of the system 400 described herein. The notice board 1002 is rendered on an application and may be accessed by a user of the system 400. The notice board 1002 notifies a user of events of interest 1004, provides plaintext notifications 1006, provides plaintext recommendations 1008, and provides real-time updates 1010.

The events of interest 1004 may be selected or indicated by a user of the system 400 and will be dependent on the type of data being ingested by the system 400. For example, if the AI/ML engine 110 is implemented to assess log data, then the events of interest 1004 could include parity errors, duplicate data entries, and so forth.

The plaintext notifications 1006 and plaintext recommendations 1008 are rendered by a large language model and may specifically be rendered by the AI/ML engine 110. The plaintext notifications 1006 are rendered in a human-readable format and provide an indication of what has been identified by the AI/ML engine 110. The plaintext recommendations 1008 are rendered in a human-readable format and provide a recommendation on troubleshooting to resolve the issue identified in the plaintext notification 1006. For example, if the AI/ML engine 110 is implemented to assess log data, then the plaintext notification 1006 could indicate that an error has been identified in the data. Further for example, the plaintext recommendations 1008 could include one or more probable causes for the issue, one or more workable solutions for the issue, one or more troubleshooting steps for resolving the issue, and so forth.

The real-time updates 1010 include notifications regarding the events of interest 1004 that are provided in real-time as the AI/ML engine 110 identifies the events of interest 1004.

Figure 11:
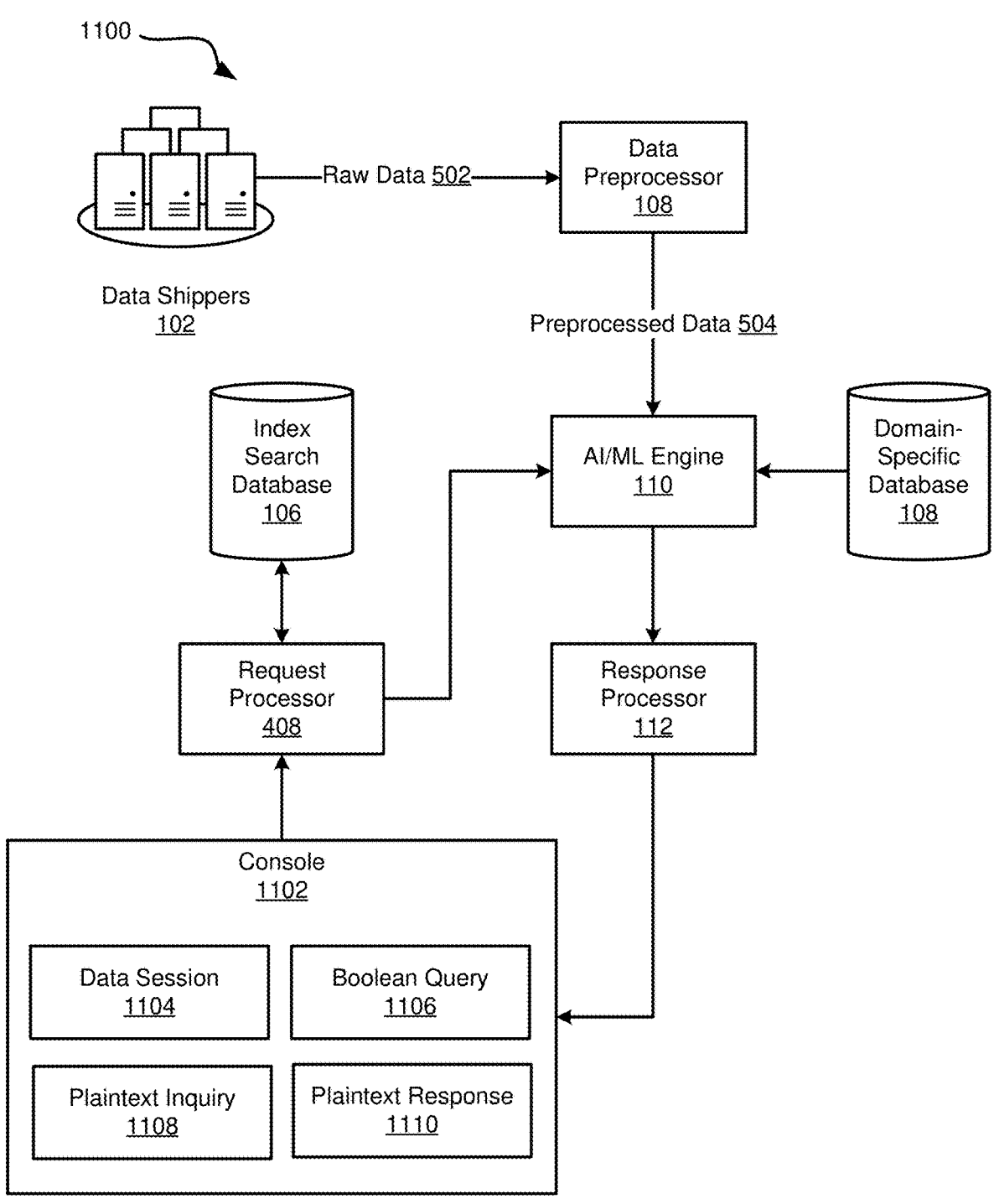
FIG. 11 is a schematic block diagram illustrating some components configured to generate data outputs rendered on a console.

FIG. 11 is a schematic block diagram illustrating a process flow 1100 for outputting data to be rendered on a console 1102. The console 1102 is rendered on an application and may be accessed by a user of the system 400. The console 1102 enables a user to generate a data session 1004, enables the user to input a Boolean query 1106, enables the user to input a plaintext inquiry 1108, and provides plaintext responses 1110.

The data session 1104 enables a user to identify and categorize different data sessions. The various data sessions 1104 may be grouped based on a time period, data source, data ingestion method, content, and so forth. The data session 1104 is a means for organizing data for easier understanding and analysis by a user.

The Boolean query 1106 enables a user to input a Boolean query to identify certain types of data, certain data issues, or certain events of interest in the index search database 106. The Boolean query 1106 is a type of query used in information retrieval and database systems to retrieve specific information from a dataset by using logical operators to combine search criteria. The Boolean query 1106 offers a flexible way to express search criteria and aid a user in finding relevant information in a large dataset.

The plaintext inquiry 1108 is input by a user and provided to the request processor 408. The plaintext inquiry 1108 may include a plaintext human-readable inquiry for certain information and does not have to be formatted according to traditional query formats, such as the Boolean query 1106 format. The plaintext inquiry 1108 is assessed by a large language model and may specifically be assessed by the AI/ML engine 110.

The plaintext response 1110 is output by the system 400 and rendered on the console 1102. The plaintext response 1110 is generated by a large learning model and may specifically be generated by the AI/ML engine 110. The plaintext response 1110 provides a human-readable response to the plaintext inquiry 1108.

By way of example, a plaintext inquiry 1108 could state, "Are any devices experiencing parity errors, if yes explain." Further to the example, the plaintext response 1110 could then state, "Yes, the first piece of context indicates that a parity error was detected in VRAM on Sep 23 01:08:35 UTC." The plaintext inquiry 1108 and plaintext response 1110 enable a user to interact with the system 400 and enjoy the benefits of the AI/ML engine 110 without significant background knowledge.

Figure 12:
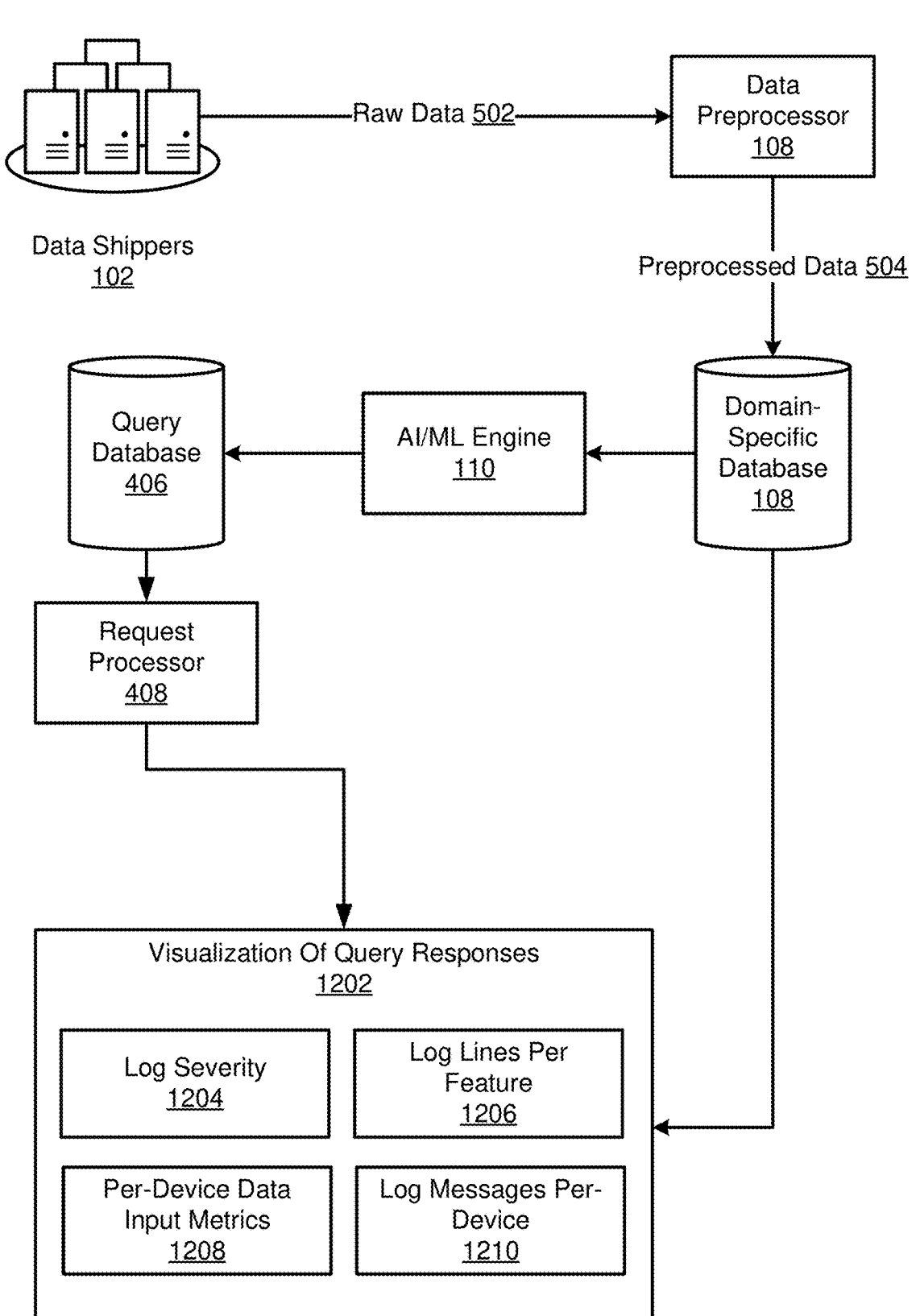
FIG. 12 is a schematic block diagram illustrating some components configured to generate data outputs rendered on a visualization dashboard.

FIG. 12 is a schematic block diagram illustrating a process flow 1200 for outputting data to be rendered according to various visualization 1202 schemas. The visualization 1202 is rendered on an application and may be accessed by a user of the system 400. The visualization may include a graphical or textual representation of one or more of log severity 1204, log lines per features 1206, per-device data input metrics 1208, and log messages per-device 1210.

The log severity 1204 may include a graphical or textual representation indicating various severity of issues identified in the logs, and the quantity of logs associated with each severity level.

The log lines per features 1206 may include a graphical or textual representation indicating a quantity of log lines relating to certain features. These features may include certain types of errors, events, configurations, messages, and so forth.

The per-device data input metrics 1208 may include a graphical or textual representation of a quantity of log messages received per device. The log messages per-devices 1210 may include a graphical or textual representation of a ratio of log messages received per device.

The request processor 408 may render visualizations 1202 based on data and characterizations output by the AI/ML engine 110. The visualizations 1202 serve as a high-level overview of the current health of an operational computing system. The visualizations may identify several types of anomalies that have been detected, including security anomalies, performance anomalies, network anomalies, application anomalies, and data anomalies. The visualizations 1202 may specifically identify security anomalies or security threats such as unauthorized access attempts, unexpected outbound traffic indicating data exfiltration, or unusual system behavior that could suggest malware activity. The visualizations 1202 may additionally identify performance anomalies such as sudden spikes or drops in system performance metrics like CPU usage, memory consumption, or disk activity. The visualizations 1202 may additionally identify network anomalies such as unexpected patterns in network traffic, high traffic volumes at odd hours, unanticipated data transfers, traffic from suspicious IP address, and so forth. The visualizations 1202 may additionally identify application anomalies such as frequent application crashes, slow response times, or unexpected outputs. The visualizations 1202 may additionally identify data anomalies such as outliers within datasets that might indicate errors in data collection, data corruption, or unique events.

Figure 13A:
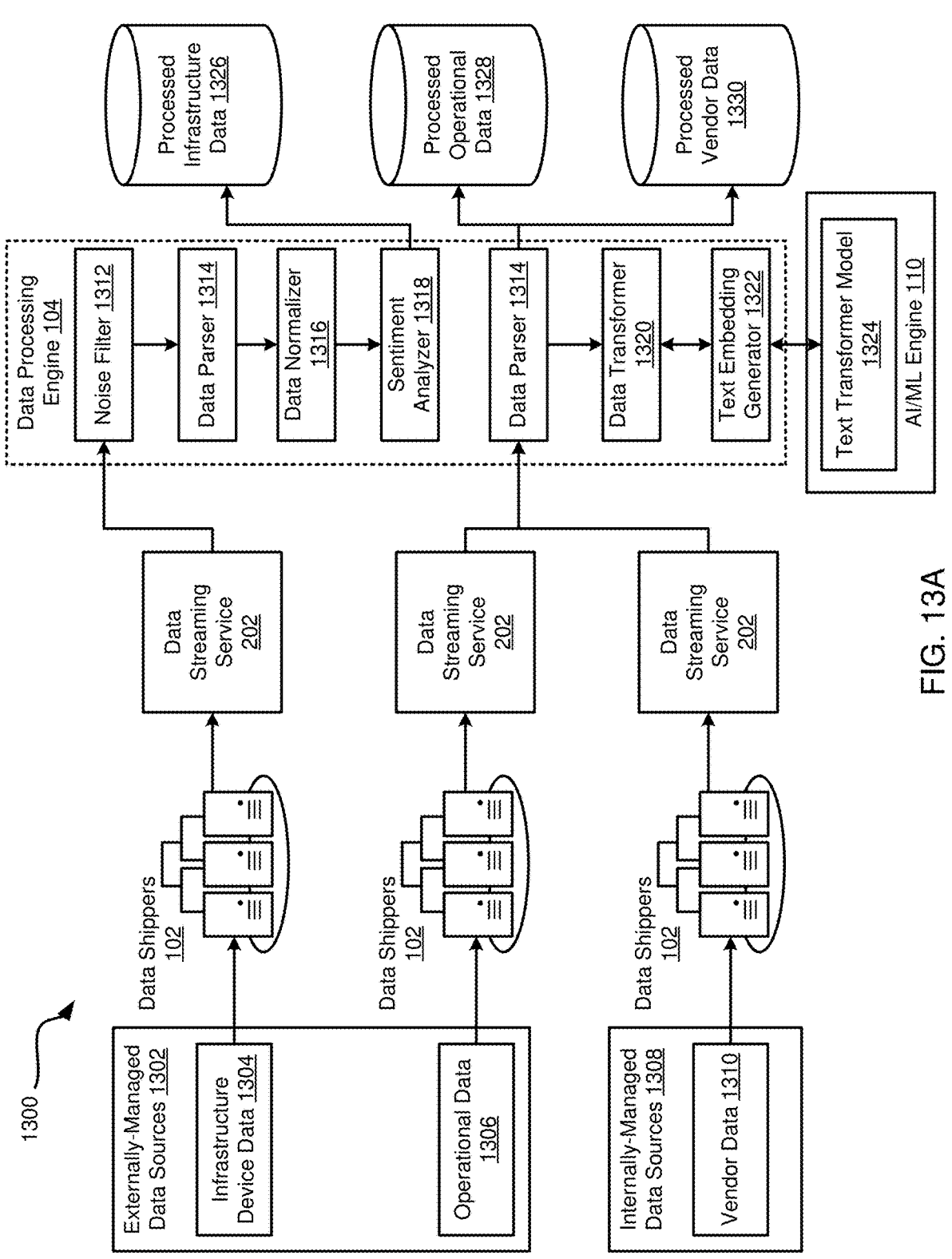
FIGS. 13A and 13B are schematic block diagrams illustrating a system for leveraging large language models to identify and track insights in log data.
Figure 13B:
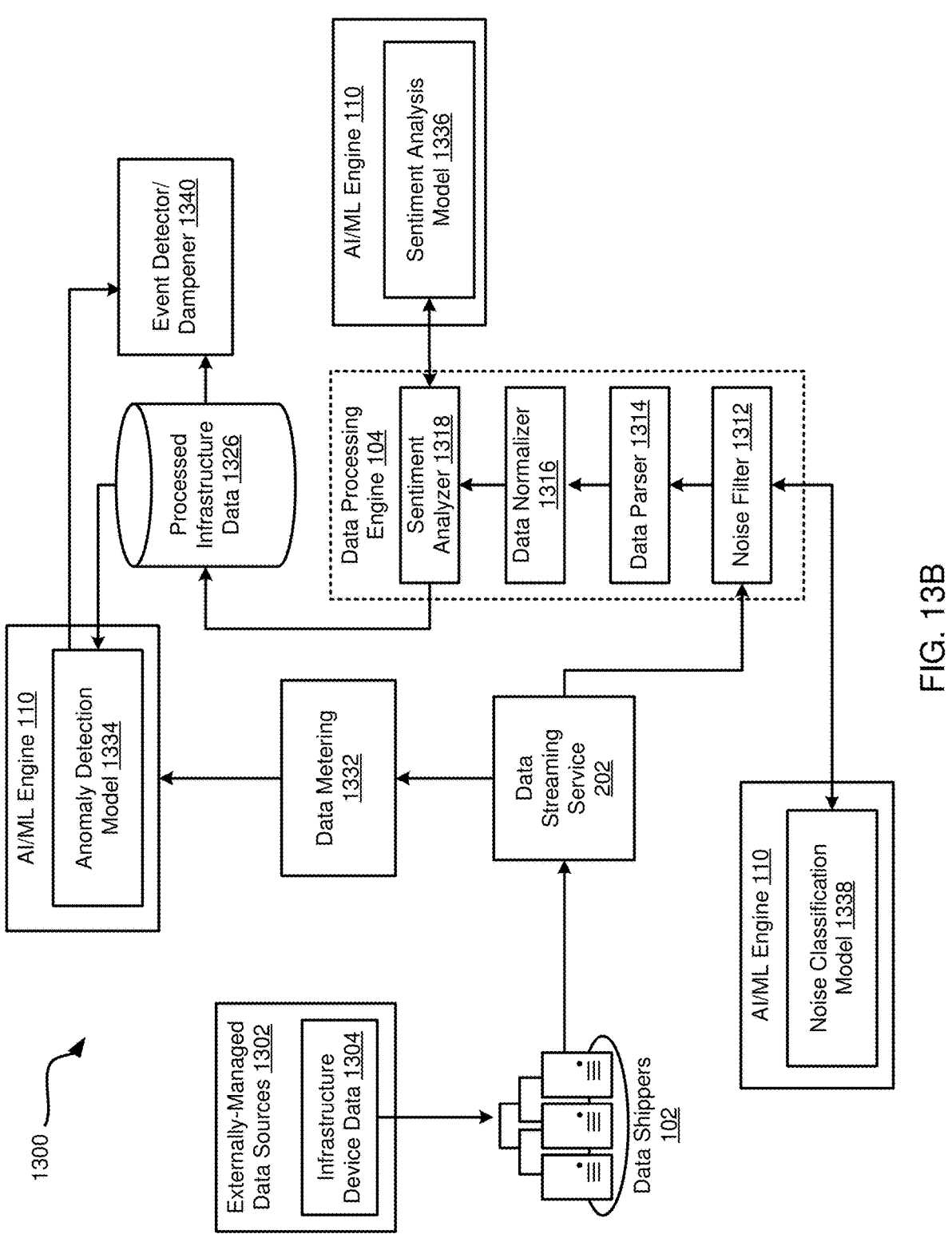

FIGS. 13A and 13B are schematic block diagrams of a data flow 1300 for leveraging large language models (LLMs) to identify and track insights in log data 1302. FIG. 13A illustrates an overview data flow for all ingested data, including infrastructure device data, operational data, and vendor data. FIG. 13B illustrates a more detailed data flow for processing infrastructure device data.

The data flow 1300 illustrated in FIGS. 13A-13B may specifically be implemented to assess log data. Logging is a common method used in software development to capture noteworthy events and states of interest. Log data may be consumed by teams that maintain and operate application software or infrastructure. Traditionally, operational teams develop tooling that utilizes methods like pattern matching or string comparison to highlight problematic events or states in the log data. This traditional approach is fragile and requires continuous updates to deal with software upgrades and changes in infrastructure. The systems and methods described herein provide improved means for ingesting and assessing log data. The "sentiment analysis" model illustrated in FIGS. 13A-13B utilizes machine learning models to identify problematic events and states within the log data. This approach is not subject to the same limitations associated with the traditional approach.

Like the system 100 first described in connection with FIG. 1, the data flow 1300 includes the data shippers 102, data streaming service 202, and AI/ML engine 110. The data flow 1300 results in generating processed infrastructure data 1326, processed operational data 1328, and processed vendor data 1330. The processed infrastructure data 1326 and processed operational data 1328 may be stored on the index search database (see 106 first described in connection with FIG. 1). The vendor data 1330 may be stored on the domain-specific database (see 108 first described in connection with FIG. 1).

The systems, methods, and devices described herein may be implemented to process log data, which may specifically include data received from externally-managed data sources 1302. The externally-managed data sources 1302 may include, for example, a client utilizing the systems, methods, and devices described herein to assess data and quickly identify anomalies within the data. The externally-managed data sources 1302 may provide one or more of infrastructure device data 1304 or operational data 1306. The systems, methods, and devices described herein will assess the infrastructure device data 1304 and operational data 1306 (may alternatively or generically referred to as "log data" herein) in view of data received from internally-managed data sources 1308. The internally-managed data sources 1308 may include data sources managed by the same entities. The internally-managed data sources 1308 may provide vendor data 1310 that is specific to the same client or entity that is providing the infrastructure device data 1304 and the operational data 1306.

When the data flow 1300 is implemented to assess log data, the infrastructure device data 1304, the operational data 1306, and the vendor data 1310 are provided to data shippers 102. The system may include separate data shippers 102 for receiving the infrastructure device data 1304, the operational data 1306, and the vendor data 1310. The data shippers 102 then feed the data to respective instances of the data streaming service 202. The data streaming service feeds data to the data processing engine 104 for additional processing.

The infrastructure device data 1304 is preprocessed by the data processing engine 104 to generate processed infrastructure data 1326. The processed infrastructure data 1326 may then be stored on the index search database (see 106 first described in connection with FIG. 1). The infrastructure device data 1304 is processed by numerous modules of the data processing engine 104, including, for example, a noise filter 1312, a data parser 1314, a data normalizer 1316, and a sentiment analyzer 1318.

The noise filter 1312 cleans and processes the infrastructure device data 1304 to remove unwanted and irrelevant information that can distort or obscure meaningful patterns within the infrastructure device data 1304.

The data parser 1314 interprets the infrastructure device data 1304 and converts the infrastructure device data 1304 from one data format into another data format. The data parser 1314 makes the infrastructure device data 1304 readable and usable for a particular application or system, such as the sentiment analyzer 1318.

The data normalizer 1316 converts data from externally-managed data sources into a system internal abstract representation.

The sentiment analyzer 1318 provides a sentiment analysis for data points within the infrastructure device data 1304. The sentiment analyzer 1318 executes instructions and metrics for determining whether a log event should be classified as a "positive," "neutral," or "negative" log event. The log event is then stored on the index search database (see 106 first described in connection with FIG. 1) with the associated sentiment classification. Thus, the processed infrastructure data 1326 include pre-processed log data that has a log sentiment analysis classification attached thereto.

The operational data 1306 is preprocessed by the data processing engine 104 to generate processed operational data 1328. The processed operational data 1328 may then be stored on the index search database (see 106 first described in connection with FIG. 1). The operational data 1306 is processed by numerous modules of the data processing engine 104, including, for example, the data parser 1314, a data transformer 1320, and a text embedding generator 1322.

The vendor data 1310 is preprocessed by the data processing engine 104 to generate processed vendor data 1330. The processed vendor data 1330 may then be stored on the domain-specific database (see 108 first described in connection with FIG. 1). The vendor data 1310 is processed by numerous modules of the data processing engine 104, including, for example, the data parser 1314, the data transformer 1320, and the text embedding generator 1322. The vendor data 1310 may further be processed by a text transformer model 1324, which is a software model executed by the AI/ML engine 110.

FIG. 13B is an extension of FIG. 13A and provides further details regarding the data flow 1300 of the infrastructure device data 1304. As shown in FIG. 13B, the infrastructure device data 1304 is provided to the data shippers 102 and then fed to the data streaming service 202. The data streaming service 202 feeds the data to the data processing engine 104, where the data is processed by the noise filter 1312, data parser 1314, data normalizer 1316, and sentiment analyzer 1318. The data streaming service 202 further feeds the infrastructure device data 1304 to a data metering 1332 service, which provides the data to an anomaly detection model 1334 of the AI/ML engine 110.

As shown in FIG. 13B, the noise filter 1312 includes or communicates with a noise classification model 1338 executed by the AI/ML engine 110. The noise classification model 1338 leverages the AI/ML engine 110 to identify data within the infrastructure device data 1304 that should be classified as noise that should be removed before the infrastructure device data 1304 undergoes further processing. Further as shown in FIG. 13B, the sentiment analyzer 1318 includes or communicates with a sentiment analysis model 1336 executed by the AI/ML engine 110. The sentiment analysis model 1336 leverages the AI/ML engine 110 to classify log events as "positive," "neutral," or "negative."

The data flow 1300 includes an anomaly detection model 1334 executed by the AI/ML engine 110. The infrastructure device data 1304 may be provided to the anomaly detection model 1334 after the data has been pre-processed by the data processing engine 104 and stored on a database as the processed infrastructure data 1326. Alternatively, or additionally, the infrastructure device data 1304 may be provided to the anomaly detection model 1334 by way of the data streaming service 202 and the data metering service 1332, which bypasses the pre-processing performed by the data processing engine 104. If the anomaly detection model 1334 identifies an anomaly, then the anomaly may be provided to the event detector/dampener 1340.

As shown in FIG. 13A, this vendor data 1310 may undergo pre-processing to generate the processed vendor data 1330.

Figure 14:
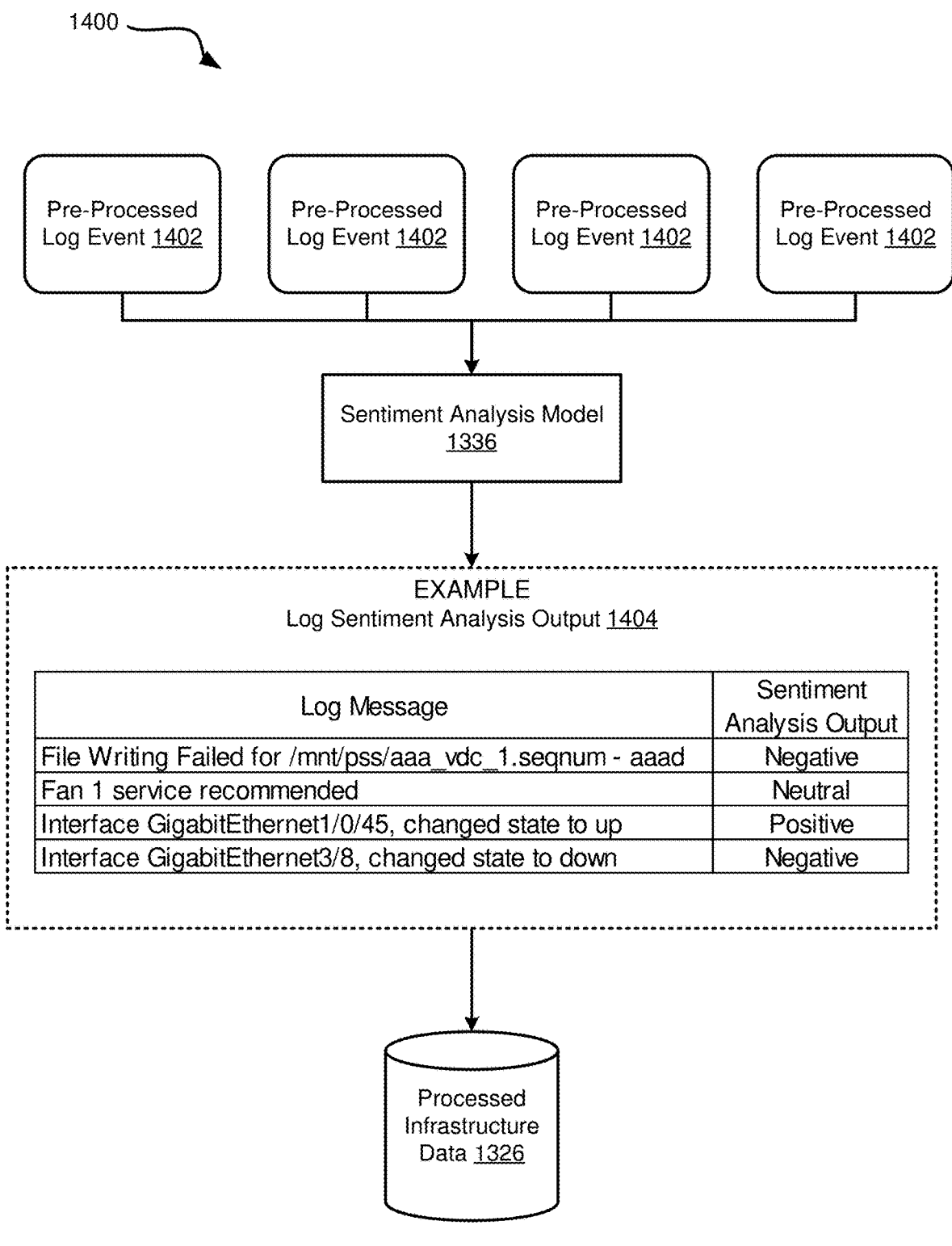
FIG. 14 is a schematic block diagram illustrating an example data flow for sentiment analysis of log data.

FIG. 14 is a schematic block diagram illustrating an example data flow 1400 for sentiment analysis of log data. The data flow 1400 begins with a plurality of pre-processed log events 1402 being provided to the sentiment analysis model 1336 of the AI/ML engine 110. The pre-processed log events 1402 may be preprocessed by the data processing engine 104 as shown in FIGS. 13A and 13B. The sentiment analysis model 1336 outputs a log sentiment analysis output 1404, such as the example output illustrated in FIG. 14. The log sentiment analysis output 1404 is stored on the processed infrastructure database 1326.

The example log sentiment analysis output 1404 illustrated in FIG. 14 includes a sentiment analysis for four pre-processed log events 1402. The first pre-processed log event 1402 states, "File writing failed for /mnt/pss/aaa_vdc_1.seqnum-aaad," and this pre-processed log event 1402 has been classified as a negative event. The second pre-processed log event 1402 states, "Fan 1 service recommended," and this pre-processed log event 1402 has been classified as a neutral event. The third pre-processed log event 1402 states, "Interface GigabitEthernet/0/45, changed stated to up," and this pre-processed log event 1402 has been classified as a positive event. The fourth pre-processed log event 1402 states, "Interface GigabitEthernet3/8, changed state to down," and this pre-processed log event 1402 has been classified as a negative event.

FIG. 15 is a schematic flow chart diagram of a method 1500 for log data analysis. The method 1500 includes ingesting at 1502 log data output by a computer system. The method 1500 includes ingesting at 1504 domain-specific data applicable to the computer system. The method 1500 includes providing at 1506 the log data and the domain-specific data to an engine configured to assess the log data in view of the domain-specific data to provide a sentiment classification to at least one log event within the log data. The method 1500 includes receiving at 1508 from the engine the sentiment classification for the at least one log event within the log data.

Figure 16:
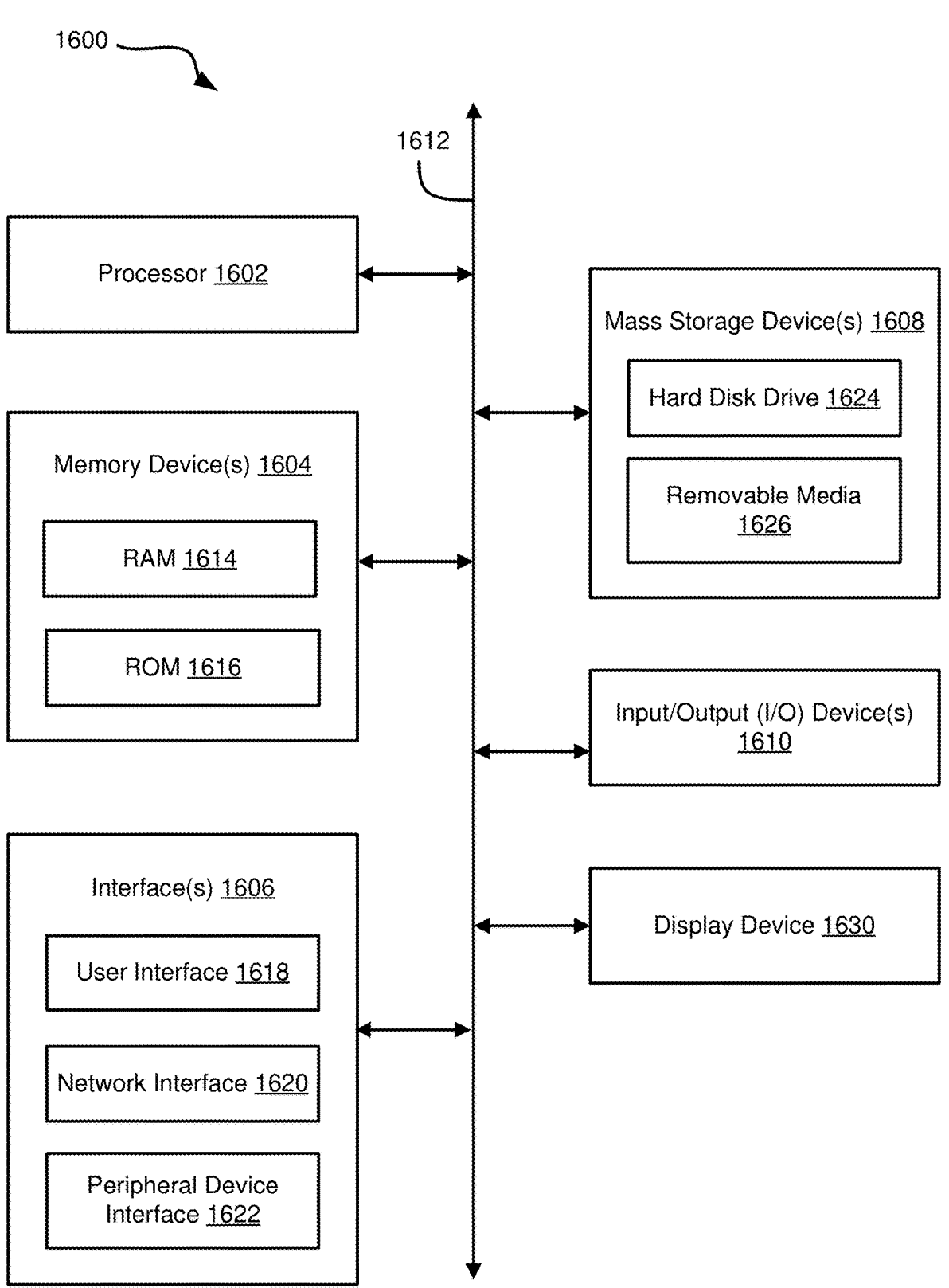
FIG. 16 is a schematic diagram illustrating components of an example computing device.

Referring now to FIG. 16, a block diagram of an example computing device 1600 is illustrated. Computing device 1600 may be used to perform various procedures, such as those discussed herein. Computing device 1600 can be any of a wide variety of computing devices, such as a desktop computer, in-dash computer, vehicle control system, a notebook computer, a server computer, a handheld computer, tablet computer and the like.

Computing device 1600 includes one or more processor(s) 1602, one or more memory device(s) 1604, one or more interface(s) 1606, one or more mass storage device(s) 1608, one or more Input/output (I/O) device(s) 1602, and a display device 1630 all of which are coupled to a bus 1612. Processor(s) 1602 include one or more processors or controllers that execute instructions stored in memory device(s) 1604 and/or mass storage device(s) 1608. Processor(s) 1602 may also include several types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device is a hard disk drive 1624. Various drives may also be included in mass storage device(s) 1608 to enable reading from and/or writing to the various computer readable media. Mass storage device(s) 1608 include removable media 1626 and/or non-removable media.

Input/output (I/O) device(s) 1602 include various devices that allow data and/or other information to be input to or retrieved from computing device 1600. Example I/O device(s) 1602 include cursor control devices, keyboards, keypads, microphones, monitors or other display devices, speakers, printers, network interface cards, modems, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, or any suitable user interface now known to those of ordinary skill in the field, or later discovered), keyboards, and the like.

Bus 1612 allows processor(s) 1602, memory device(s) 1604, interface(s) 1606, mass storage device(s) 1608, and I/O device(s) 1602 to communicate with one another, as well as other devices or components coupled to bus 1612. Bus 1612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1600 and are executed by processor(s) 1602. Alternatively, the systems and procedures described herein can be implemented in hardware, or a combination of hardware, software, and/or firmware. For example, one or more application specific integrated circuits (ASICs) can be programmed to conduct one or more of the systems and procedures described herein.

EXAMPLES

The following examples pertain to further embodiments.

Example 1 is a system. The system includes a data shipper configured to ingest raw data; a data preprocessor configured to receive the raw data from the data shipper and processes the raw data to generate processed data; a database that stores the processed data; and a machine learning engine in communication with the database. The machine learning engine executes a large language model algorithm on the processed data to identify one or more of: an anomaly in the processed data; or two or more correlated events in the processed data.

Example 2 is a system as in Example 1, wherein the raw data ingested by the data shipper comprises a log file for a network application.

Example 3 is a system as in any of Examples 1-2, wherein processing the raw data by the data preprocessor comprises amending the raw data to reduce one or more of a storage requirement or a processor requirement for executing the large language model to identify the anomaly in the processed data.

Example 4 is a system as in any of Examples 1-3, wherein processing the raw data by the data preprocessor comprises one or more of: abbreviating one or more terms in the raw data; substituting a large length identifier in the raw data with a shorter length identifier; or suppressing duplicate information identified in the raw data.

Example 5 is a system as in any of Examples 1-4, wherein processing the raw data by the data preprocessor comprises suppressing correlated events.

Example 6 is a system as in any of Examples 1-5, wherein processing the raw data by the data preprocessor comprises suppressing an event based on a user configuration.

Example 7 is a system as in any of Examples 1-6, further comprising a request processor in communication with the machine learning engine, wherein the request processor receives an event output from the machine learning engine, and wherein the event output comprises the one or more of the identified anomaly or the identified two or more correlated events.

Example 8 is a system as in any of Examples 1-7, wherein the request processor is configured to generate a notification relating to the event output, and wherein the notification comprises: a plaintext notification explaining the event output; and a plaintext recommendation relating to the event output, wherein the plaintext recommendation comprises an indication of a possible action to be taken by a user to assess or resolve the event output.

Example 9 is a system as in any of Examples 1-8, wherein the notification is generated by a large language model.

Example 10 is a system as in any of Examples 1-9, further comprising an archive database that is independent of the database that stores the processed data, wherein the archive database receives a stream comprising the raw data, and wherein the archive database stores a copy of the raw data.

Example 11 is a system as in any of Examples 1-10, further comprising a domain-specific database in communication with the machine learning engine, wherein the domain-specific database stores context information provided to the machine learning engine to improve execution of the large language model algorithm.

Example 12 is a system as in any of Examples 1-11, wherein the machine learning engine executes the large language model algorithm based on the processed data and additionally based on the context information stored in the domain-specific database.

Example 13 is a system as in any of Examples 1-12, further comprising a feedback database that stores user feedback pertaining to outputs generated by the machine learning engine.

Example 14 is a system as in any of Examples 1-13, further comprising a request processor in communication with the machine learning engine, wherein the request processor is configured to execute instructions comprising: receiving a Boolean query relating to data stored on a query database, wherein the query database is in communication with the request processor and the machine learning engine; execute the Boolean query on the query database; and provide a plaintext response to the Boolean query; wherein the plaintext response is generated by a large language model.

Example 15 is a system as in any of Examples 1-14, further comprising a request processor in communication with the machine learning engine, wherein the request processor is configured to execute instructions comprising: receiving a plaintext inquiry relating to data stored on a query database, wherein the query database is in communication with the request processor and the machine learning engine; provide the plaintext inquiry to a large language model configured to assess the plaintext inquiry; and provide a plaintext response to the plaintext inquiry, wherein the plaintext response is generated by the machine learning engine.

Example 16 is a system as in any of Examples 1-15, further comprising a request processor in communication with the machine learning engine, wherein the request processor is configured to render a graphical representation of an indication of a quantity of anomalies identified in the processed data.

Example 17 is a system as in any of Examples 1-16, wherein the identified anomaly comprises a threshold-based detection, and wherein the threshold-based detection is based on a predefined threshold for a log attribute, and wherein the log attribute comprises one or more of response time, error rate, or CPU usage.

Example 18 is a system as in any of Examples 1-17, wherein the machine learning engine is configured to identify the anomaly based on established normal behavior, wherein the established normal behavior is determined based on historical data, and wherein the anomaly constitutes a deviation from the established normal behavior.

Example 19 is a system as in any of Examples 1-18, wherein the machine learning engine is configured to identify the deviation from the established normal behavior utilizing one or more of a clustering algorithm or a classification algorithm.

Example 20 is a system as in any of Examples 1-19, wherein the machine learning engine is configured to identify the two or more correlated events in the processed data by performing sequence analysis on the processed data.

Example 21 is a method. The method includes ingesting log data output by a computer system; ingesting domain-specific data applicable to the computer system; providing the log data and the domain-specific data to an engine configured to assess the log data in view of the domain-specific data to provide a sentiment classification to at least one log event within the log data; and receiving from the engine the sentiment classification for the at least one log event within the log data.

Example 22 is a method as in Example 21, wherein the sentiment classification comprises one of: an indication the at least one log event is a negative event; an indication the at least one log event is a neutral event; or an indication the at least one log event is a positive event.

Example 23 is a method as in any of Examples 21-22, further comprising: preprocessing the log data prior to providing the log data to the engine, wherein preprocessing the log data comprises amending the log data to reduce one or more of a storage requirement or a processor requirement for assessing the log data to determine the sentiment classification; and storing the preprocessed log data on a database; wherein providing the log data to the engine comprises instructing the engine to extract the log data from the database.

Example 24 is a method as in any of Examples 21-23, further comprising preprocessing the log data prior to providing the log data to the engine, wherein preprocessing the log data comprises one or more of: abbreviating one or more terms in the log data; substituting a large length identifier in the log data with a shorter length identifier; or suppressing duplicate information identified in the log data.

Example 25 is a method as in any of Examples 21-24, wherein the domain-specific data comprises an indication of an appropriate sentiment classification for an event type identified in the log data.

Example 26 is a method as in any of Examples 21-25, further comprising: providing the log data and the domain-specific data to the engine to identify an anomaly in the log data; and receiving from the engine a notification applicable to the anomaly identified in the log data, wherein the notification comprises a sentiment classification for the anomaly.

Example 27 is a method as in any of Examples 21-26, further comprising: providing the log data and the domain-specific data to the engine to identify two or more correlated events in the log data; and receiving from the engine a notification applicable to the two or more correlated events identified in the log data, wherein the notification comprises a sentiment classification for the two or more correlated events.

Example 28 is a method as in any of Examples 21-27, wherein the log data comprises one or more of system logs, application logs, security logs, web server logs, database logs, network logs, or audit logs.

Example 29 is a method as in any of Examples 21-28, wherein the engine is a machine learning engine; and wherein the machine learning engine executes a large language model algorithm on the log data to identify the at least one log event.

Example 30 is a method as in any of Examples 21-29, further comprising generating a notification relating to the sentiment classification for the at least one log event, and wherein the notification comprises: a plain-text notification explaining the at least one log event; and the sentiment classification for the at least one log event, wherein the sentiment classification comprises one of a neutral sentiment classification, a negative sentiment classification, or a positive sentiment classification.

Example 31 is a method as in any of Examples 21-30, wherein generating the notification comprises generating utilizing a large language model algorithm.

Example 32 is a method as in any of Examples 21-31, further comprising storing the log data on an archive database, wherein the archive database is independent of the computer system, and wherein the archive database is further independent of a domain-specific database storing the domain-specific data.

Example 33 is a method as in any of Examples 21-32, wherein the at least one log event indicates that a file writing sequence has failed; wherein the engine processes the at least one log event with a large language model algorithm; and wherein the engine applies a negative sentiment classification to the at least one log event.

Example 34 is a method as in any of Examples 21-33, wherein the at least one log event indicates that a hardware component of the computer system should undergo routine servicing; wherein the engine processes the at least one log event with a large language model algorithm; and wherein the engine applies a neutral sentiment classification to the at least one log event.

Example 35 is a method as in any of Examples 21-34, wherein the at least one log event indicates that a hardware component of the computer system has undergone a state change and is now operating in an online or functional state; wherein the engine processes the at least one log event with a large language model algorithm; and wherein the engine applies a positive sentiment classification to the at least one log event.

Example 36 is a method as in any of Examples 21-35, wherein the at least one log event indicates that a hardware component of the computer system has undergone a state change and is now non-operational due to being in an offline or non-functional state; wherein the engine processes the at least one log event with a large language model algorithm; and wherein the engine applies a negative sentiment classification to the at least one log event.

Example 37 is non-transitory computer readable storage medium storing instructions to be executed by one or more processors, the instructions comprising any of the method steps of Examples 21-26.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to conduct one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method comprising:

ingesting raw log data output by a plurality of data shippers associated with a computer system;

ingesting domain-specific data applicable to the computer system, wherein the domain-specific data is stored on a domain-specific database;

preprocessing the raw log data by abbreviating well-known domain-specific terms within the raw log data, wherein the well-known domain-specific terms are identified in the domain-specific data;

storing the preprocessed log data on an index search database in communication with an engine comprising a large language model, wherein the index search database is independent of the domain-specific database;

causing the engine to execute the large language model to assess the preprocessed log data stored on the index search database in view of the domain-specific data to provide a sentiment classification to a first log event within the preprocessed log data;

receiving from the engine a first sentiment classification for a first log event within the preprocessed log data;

storing the first log event with the first sentiment classification on the index search database.

2. The method of claim 1, wherein the first sentiment classification for the first log event comprises one of:

an indication the first log event is a negative event for the computer system;

an indication the first log event is a neutral event for the computer system; or an indication the first log event is a positive event for the computer system.

3. The method of claim 1, wherein preprocessing the raw log data further comprises amending the raw log data to reduce one or more of a storage requirement or a processor requirement for assessing the raw log data.

4. The method of claim 1, wherein preprocessing the raw log data further comprises:

abbreviating one or more terms in the log data;

substituting a large length identifier in the log data with a shorter length identifier; and suppressing duplicate information identified in the log data.

5. The method of claim 1, wherein the domain-specific data comprises an indication of an appropriate sentiment classification for an event type identified in the preprocessed log data.

6. The method of claim 1, further comprising:

causing the engine to execute the large language model to assess the preprocessed log data in view of the domain-specific data to identify an anomaly in the preprocessed log data; and receiving from the engine a notification applicable to the anomaly identified in the preprocessed log data, wherein the notification comprises a sentiment classification for the anomaly.

7. The method of claim 1, further comprising:

causing the engine to execute the large language model to assess the preprocessed log data in view of the domain-specific data to identify two or more correlated events in the preprocessed log data; and receiving from the engine a notification applicable to the two or more correlated events identified in the preprocessed log data, wherein the notification comprises a sentiment classification for the two or more correlated events.

8. The method of claim 1, wherein the raw log data comprises one or more of system logs, application logs, security logs, web server logs, database logs, network logs, or audit logs.

9. The method of claim 1, wherein the engine is an artificial intelligence 9. and/or machine learning engine.

10. The method of claim 1, further comprising generating a notification relating to the first sentiment classification for the first log event, and wherein the notification comprises:

a plaintext notification explaining the first log event; and the sentiment classification for the first log event, wherein the sentiment classification comprises one of a neutral sentiment classification, a negative sentiment classification, or a positive sentiment classification.

11. The method of claim 10, wherein generating the notification comprises causing the engine to execute the generating utilizing a large language model algorithm.

12. The method of claim 1, further comprising storing the raw log data on an archive database, wherein the archive database is independent of the computer system, and wherein the archive database is further independent of a domain-specific database storing the domain-specific data.

13. The method of claim 1, wherein the first log event indicates that a file writing sequence has failed; and wherein the engine applies a negative sentiment classification to the first log event.

14. The method of claim 1, wherein the first log event indicates that a hardware component of the computer system should undergo routine servicing; and wherein the engine applies a neutral sentiment classification to the first log event.

15. The method of claim 1, wherein the first log event indicates that a hardware component of the computer system has undergone a state change and is now operating in an online or functional state; and wherein the engine applies a positive sentiment classification to the first log event.

16. The method of claim 1, wherein the first log event indicates that a hardware component of the computer system has undergone a state change and is now non-operational due to being in an offline or non-functional state; and wherein the engine applies a negative sentiment classification to the first log event.

17. Non-transitory computer readable storage medium storing instructions to be executed by one or more processors, the instructions comprising:

ingesting raw log data output by a plurality of data shippers associated with a computer system;

ingesting domain-specific data applicable to the computer system, wherein the domain-specific data is stored on a domain-specific database;

preprocessing the raw log data by abbreviating well-known domain-specific terms within the raw log data, wherein the well-known domain-specific terms are identified in the domain-specific data;

storing the preprocessed log data on an index search database in communication with an engine comprising a large language model, wherein the index search database is independent of the domain-specific database;

causing the engine to execute the large language model to assess the preprocessed log data stored on the index search database in view of the domain-specific data to provide a sentiment classification to a first log event within the preprocessed log data;

receiving from the engine a first sentiment classification for a first log event within the preprocessed log data;

storing the first log event with the first sentiment classification on the index search database.

18. The non-transitory computer readable storage medium of claim 17, wherein the first sentiment classification for the first log event comprises one of:

an indication the first log event is a negative event for the computer system;

an indication the first log event is a neutral event for the computer system; or an indication the first log event is a positive event for the computer system.

19. The non-transitory computer readable storage medium of claim 17, wherein the instructions are such that preprocessing the raw log data further comprises prior to providing the log data to the engine, wherein preprocessing the log data comprises amending the raw log data to reduce one or more of a storage requirement or a processor requirement for assessing the raw log data.

20. The non-transitory computer readable storage medium of claim 17, wherein the instructions are such that preprocessing the raw log data further comprises:

abbreviating one or more terms in the log data;

substituting a large length identifier in the log data with a shorter length identifier; or suppressing duplicate information identified in the log data.

* * * * *